(12) United States Patent
Nakamura

(10) Patent No.: US 8,405,860 B2
(45) Date of Patent: Mar. 26, 2013

(54) RECORDING SYSTEM AND COMMUNICATION CONTROL METHOD FOR A RECORDING SYSTEM

(75) Inventor: Hiroyuki Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 12/841,107

(22) Filed: Jul. 21, 2010

(65) Prior Publication Data

US 2011/0019231 A1  Jan. 27, 2011

(30) Foreign Application Priority Data

Jul. 23, 2009 (JP) ................................. 2009-171897
Jun. 8, 2010 (JP) ................................. 2010-131108

(51) Int. Cl.
*G06F 15/00* (2006.01)
*G06F 13/00* (2006.01)

(52) U.S. Cl. ..................... 358/1.15; 719/328

(58) Field of Classification Search .................. 358/1.15
See application file for complete search history.

(56) References Cited

U.S. PATENT DOCUMENTS

| 5,948,069 | A | 9/1999 | Kitai et al. |
| 7,164,437 | B2 * | 1/2007 | Truc et al. ........................ 348/96 |
| 2006/0139674 | A1 * | 6/2006 | Oshima ........................ 358/1.13 |
| 2008/0010647 | A1 | 1/2008 | Chapel et al. |

FOREIGN PATENT DOCUMENTS

| JP | 9-93304 A | 4/1997 |
| JP | 2001-331284 | 11/2001 |
| JP | 2007-317181 A | 12/2007 |

* cited by examiner

*Primary Examiner* — Saeid Ebrahimi Dehkordy
(74) *Attorney, Agent, or Firm* — Kilpatrick Townsend & Stockton LLP

(57) ABSTRACT

A host computer and recording device can be connected using an existing communication interface, and data can be transmitted between the host computer and recording device at high speed. A recording system 1 has a printer 4 with a plurality of serial interfaces 4A, 4B that can communicate independently, and a host computer 2 with a plurality of serial interfaces 2A, 2B that can communicate independently. The serial interfaces 4A, 4B and serial interfaces 2A, 2B are connected 1:1 to form communicate lines. A plurality of virtual communication channels are assigned to these communication lines and data is exchanged by packet communication over these communication channels. When the printer 4 and host computer 2 are connected through a plurality of communication lines 3A, 3B, only the data channel 31 is assigned to at least one communication line 3A.

13 Claims, 18 Drawing Sheets

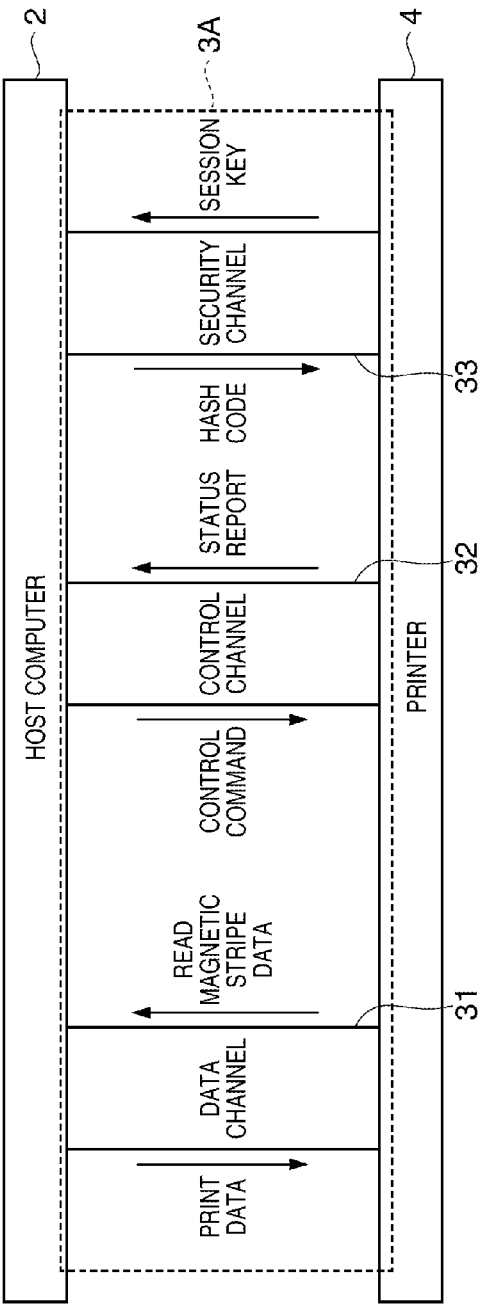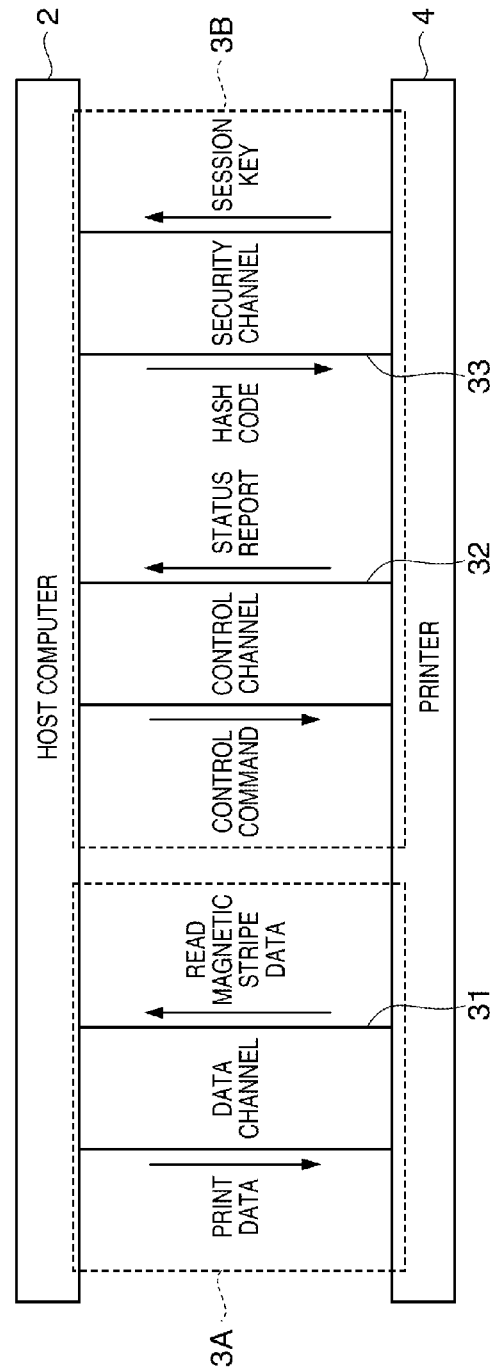

| No. | STANDARD | BIT RATE | ENCRYPTION METHOD | SECURITY LEVEL |
|---|---|---|---|---|
| 1 | 802.11b | 11Mbps | WEP | 1 |
| 2 | 802.11n | 300Mbps | WPA2 | 10 |

FIG. 12

| No. | PARAMETER | RULE |
|---|---|---|
| 1 | SECURITY LEVEL | ASSIGN DATA COMMUNICATION CHANNEL TO HIGHEST |
| 2 | BIT RATE | ASSIGN DATA COMMUNICATION CHANNEL TO HIGHEST |
| ⋮ | ⋮ | ⋮ |

FIG. 13

RECORDING SYSTEM AND COMMUNICATION CONTROL METHOD FOR A RECORDING SYSTEM

This application claims priority to Japanese Patent Application No. 2009-171897, filed Jul. 23, 2009 and Japanese Patent Application No. 2010-131108, filed Jun. 8, 2010, the entireties of which are incorporated by reference herein.

BACKGROUND

1. Technical Field

The present invention relates to a recording system and to a communication control method for the recording system.

2. Related Art

Printers and other recording devices are typically connected through a communication interface such as the RS-232C interface to a host computer as the control device, and recording data such as text and images to be recorded to a recording medium, and commands controlling the recording operation, are sent from the host computer to the recording device. See, for example, Japanese Unexamined Patent Appl. Pub. JP-A-H06-340149.

Due to the limits of the communication speed allowed by the communication interface, transferring large amounts of data, such as the recording data portion of the data and commands that are sent from the host computer to the recording device, to the recording device is time-consuming. The specifications of the communication interface therefore create a bottleneck. However, increasing the communication speed by modifying the specifications of a widely used general-purpose communication interface, or deviating from the specification, results in a loss of versatility, and increasing the speed is therefore difficult. Changing the physical specifications in particular is extremely difficult.

SUMMARY

The present invention relates to technology for connecting a host computer and recording device using an existing communication interface so that data can be transmitted at high speed between the host computer and recording device.

A first aspect of the invention is a recording system including a recording device having a plurality of communication interfaces that can communicate independently, and a host computer having a plurality of communication interfaces that can communicate independently. The communication interfaces of the recording device and the communication interfaces of the host computer are connected 1:1 rendering communication paths, a plurality of virtual communication channels including a data communication channel and a control communication channel are assigned to the communication paths, data is communicated by packet communication through these communication channels, and when the recording device and host computer are connected through the plural communication paths, only the data communication channel is assigned to at least one of the plural communication paths.

Because this aspect of the invention renders a plurality of communication paths by connecting a plurality of communication interfaces that can each communicate independently 1:1, and assigns only a data communication channel to at least one of the communication paths, the data communication channel that carries large amounts of data occupies one communication path. As a result, because the bit rate of the data communication channel can thus be reserved preferentially to the other virtual communication channels, and the speed of communication through the data communication channel that easily becomes a bottleneck can be increased, the host computer and recording device can be connected using an existing communication interface to send and receive data at high speed. In addition, by increasing the speed of communication through the data communication channel that tends to become a bottleneck, the overall operating speed of the recording system can be increased and throughput can be improved.

In another aspect of the invention, when the recording device and the host computer are connected by one communication path, a packet containing information identifying the communication channel is generated and transmitted by packet communication through the communication path. When the recording device and the host computer are connected by a plurality of communication paths, packets transmitted on the data communication channel are packets not containing information identifying the communication channel.

This aspect of the invention can increase the actual transmission speed of the data communication channel because packet overhead is reduced by removing information identifying the communication channel from the packets carried on the data communication channel.

In another aspect of the invention, recording data is transmitted at least from the host computer to the recording device on the data communication channel.

Because this aspect of the invention transmits data such as recording data, which contains more data than control information, over a data communication channel that occupies at least one communication path, communication of recording data that can easily become a bottleneck can be accelerated, the operating speed of the overall recording system can be increased, and throughput can be improved. In addition, when the recording device has a magnetic, optical, or other type of reading device, the read data can also be sent from the recording device to the host computer over the data communication channel.

Further preferably in another aspect of the invention, the control communication channel includes at least one of a channel for communicating information related to security, and a channel for communicating information related to a status of the recording device or the host computer.

This aspect of the invention can improve the safety and reliability of communication by transmitting encryption information for the communicated data and information confirming if the data was actually received. In addition, the recording device and the host computer can each confirm if the other is ready to receive before starting transmission.

In another aspect of the invention, the recording device and the host computer have a plurality of communication interfaces rendering communication paths of different attributes; a plurality of communication paths having different attributes are rendered by these plural communication interfaces; and the communication channels are assigned based on the attributes of the individual communication paths to the plural communication paths.

This aspect of the invention can use the features of the communication paths to enable efficient, highly utilitarian communication by using the attributes of the communication paths to assign the communication channels to the plural communication paths of different attributes formed between the recording device and the host computer.

In a recording system according to another aspect of the invention, the plural communication interfaces of the recording device and the host computer include a wired communication interface rendering a wired communication path and a wireless communication interface rendering a wireless communication path; a wired communication path and a wireless communication path are rendered between the recording device and the host computer by these plural communication interfaces; and a plurality of virtual communication channels including a data communication channel and a control communication channel are assigned to the plural communication paths including the wired communication path and the wireless communication path.

This aspect of the invention can use the features of the communication paths to assign the communication channels to the wired communication path and wireless communication path created between the recording device and the host computer, and enable efficient, highly utilitarian communication.

In another aspect of the invention, a data communication channel is assigned to the wired communication path, and the control communication channel is assigned to the wireless communication path.

By using a wireless communication path, this aspect of the invention enables saving the work related to laying and connecting communication cable. In addition, by assigning the data communication channel to a wired communication path having good data security, the confidentiality of data sent between the host computer and the recording device can be assured. In addition, system throughput can be improved by transmitting data through a wired communication path whereby high speed communication can be easily achieved.

Yet further preferably in another aspect of the invention, the recording device and the host computer each have as the communication interfaces a plurality of wireless communication interfaces rendering wireless communication paths; a plurality of wireless communication paths are rendered between the recording device and the host computer by these plural communication interfaces; and a plurality of virtual communication channels including a data communication channel and control communication channel are assigned to each of the communication paths based on the possible communication speeds or an indicator of the robustness of the security of these wireless communication paths.

This aspect of the invention enables efficient communication because the communication channels are assigned to the communication paths based on the maximum possible communication speeds of the plural wireless communication paths. As a result, system throughput can be improved because the assignments correspond to the possible communication speeds, and confidentiality can be assured by assignment based on the robustness of communication security.

In another aspect of the invention, when data sent and received through the data communication channel can be typed based on an attribute, packets are transmitted by data type through the data communication channel and another communication channel assigned to a communication path other than the data communication channel.

By categorizing the data that is communicated based on an attribute, and sending and receiving the data on different communication channels based on attribute, this aspect of the invention can efficiently use a plurality of communication channels to improve communication efficiency, improve throughput, and improve the operating stability of the system.

In a recording system according to another aspect of the invention, an auxiliary data communication channel is assigned to a communication path other than the communication path to which the data communication channel is assigned, and when the data transmitted on the data communication channel can be typed based on an attribute, packets are sent and received by switching the data communication channel and auxiliary data communication channel based on data type.

This aspect of the invention can further improve communication efficiency, improve throughput, and improve the stability of system operation by assigning a data communication channel and auxiliary data communication channel to different communication paths, and selectively using the data communication channel and auxiliary data communication channel based on data attributes.

In a recording system according to another aspect of the invention, the communication path to which the data communication channel is assigned and the communication path to which the auxiliary data communication channel is assigned have different attributes; and when the data transmitted on the data communication channel can be typed based on an attribute, packets are transmitted by switching the data communication channel and auxiliary data communication channel based on data type and communication path attributes.

By assigning the data communication channel and auxiliary data communication channel to communication paths with different attributes, and optimally combining and using the data communication channel and auxiliary data communication channel according the attributes of the data and the attributes of the communication paths, the characteristics of the communication paths can be utilized to further improve communication efficiency, improve throughput, and improve the stability of system operation.

In a recording system according to another aspect of the invention, the communication interface is preferably a serial interface.

When the recording device and host computer are connected through an existing standardized serial interface, this aspect of the invention can actually increase the data communication speed without operations that deviate from the standard to increase the transmission speed.

Another aspect of the invention is that has a recording device having a plurality of communication interfaces that can communicate independently, and a host computer having a plurality of communication interfaces that can communicate independently, and the communication interfaces of the recording device and the communication interfaces of the host computer are connected 1:1 rendering physical communication paths. The communication control method includes steps of assigning a plurality of virtual communication channels including a data communication channel and a control communication channel to the communication paths and sending and receiving data through these communication channels by packet communication, and assigning only the data communication channel to at least one of the plural communication paths for communication when the recording device and host computer are connected by the plural communication paths.

This method connects a plurality of communication interfaces that can each communicate independently to render a plurality of physical communication paths, and the data communication channel that carries the largest amount of communicated data occupies at least one of these communication paths. As a result, the transmission speed of the data communication channel can be prioritized over the other virtual communication channels, and communication through the data communication channel that can easily become a bottleneck can be accelerated. The host computer and recording device can therefore be connected using existing communication interfaces to send and receive data at high speed. In addition, by increasing the speed of communication over the data communication channel that can easily become a bottleneck, the operating speed of the overall recording device can be increased and throughput can be improved.

When the recording device and the host computer are connected by one communication path, the communication control method for a recording system according to another aspect of the invention generates a packet containing information identifying the communication channel and communicates by packet communication through the communication path. When the recording device and the host computer are connected by a plurality of communication paths, packets transmitted on the data communication channel are preferably packets not containing information identifying the communication channel.

Further preferably in another aspect of the invention, data is transmitted from the host computer to the recording device on the data communication channel, and at least information related to security or information related to a status of the recording device or the host computer is communicated through the control communication channel.

The plural communication paths rendered by connecting a plurality of communication interfaces 1:1 in the configuration described above are each physical communication paths and the communication paths can be physically differentiated. More specifically, wired communication paths using a communication cable, for example, as the transmission medium can be physically differentiated by identifying the communication cable, and are one type of physical communication path.

Wireless communication paths that use electromagnetic waves (including radio waves and light) as the medium enable differentiating the signals carried on each communication path from the frequency of the electromagnetic waves or the encryption method, for example, and enable extracting only the signals on a particular communication path by identifying the frequency or encryption method. Wireless communication paths are therefore also a type of physical communication path. For example, when the wireless communication interface can communicate over a plurality of channels on different frequency bands, each channel can be physically differentiated by frequency and is therefore equivalent to a physical communication path.

Effect of the Invention

The invention can increase the speed of communication through a data communication channel that easily becomes a bottleneck, connect a host computer and recording device using an existing communication interface and send and receive data at high speed, and can improve the throughput of the entire recording system.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 shows an example of the connection between the host computer and printer.

FIG. 3 shows an example of the connection between the host computer and printer.

FIG. 12 schematically describes the structure of the communication path attribute table.

FIG. 13 schematically describes the structure of a communication rule table.

DESCRIPTION OF EMBODIMENTS

Preferred embodiments of the present invention are described below with reference to the accompanying figures.

Embodiment 1

Figure 1:
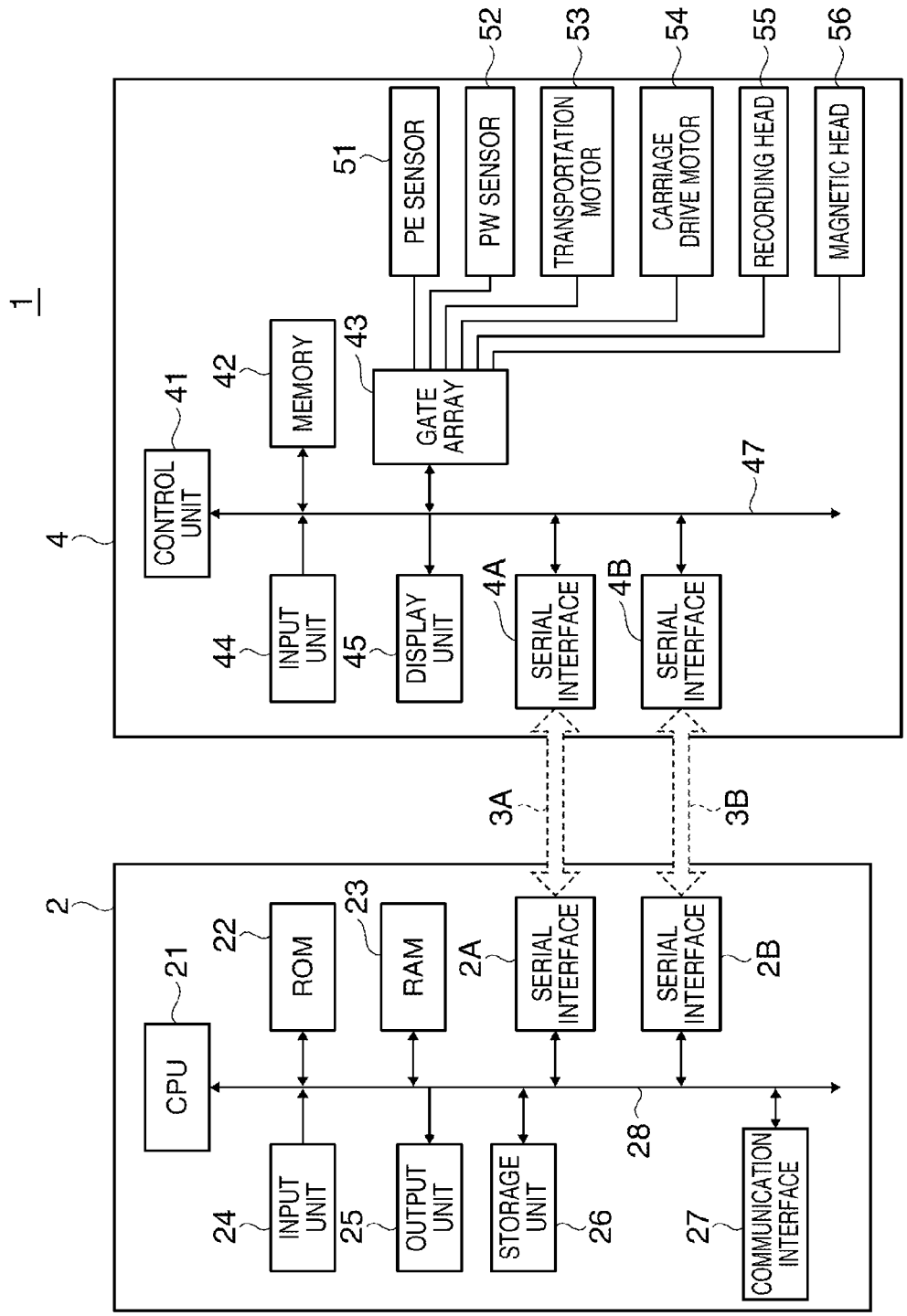
FIG. 1 is a function block diagram of a recording system according to a first embodiment of the invention.

FIG. 1 is a function block diagram of a recording system according to a first embodiment of the invention.

As shown in FIG. 1, the recording system 1 has a host computer 2 and a printer 4 connected thereto as a recording device.

The host computer 2 has a CPU 21, ROM 22, RAM 23, an input unit 24, an output unit 25, a storage unit 26, a communication interface 27, and two serial interfaces 2A, 2B that are connected to each other over a bus 28.

The CPU 21 renders various functions including controlling the printer 4 by executing a basic control program stored in ROM 22 and controlling other parts of the host computer 2. Data and the basic control program executed by the CPU 21 are stored in ROM 22. Data and programs executed by the CPU 21 are temporarily stored in RAM 23. The input unit 24 is connected to an input device such as a keyboard or mouse, detects operations from these input devices, and outputs an operation signal corresponding to the executed operation to the CPU 21. The output unit 25 is connected to an output device such as a display, and outputs to the output device the results of processes executed by the CPU 21 and input content from the input unit 24. The storage unit 26 stores application programs executed by the CPU 21, and data related to the programs. The communication interface 27 is connected to an external communication network, and sends and receives information through the communication network.

The serial interfaces 2A, 2B are communication interfaces that are configured to communicate independently of each other, and each has a connector (not shown in the figure) conforming to a serial communication standard such as RS-232C or USB. Connector cables (not shown in the figure) rendering communication lines 3A, 3B as physical communication paths can be connected to the connectors. The serial interfaces 2A, 2B send and receive data with the printer 4 through the communication lines 3A, 3B rendered by these connection cables.

When the data to be transmitted is input from the CPU 21, the serial interfaces 2A, 2B convert the input data and produce packets conforming to the protocol defined by the relevant specification, and transmit the resulting packets through the communication lines 3A, 3B.

The serial interfaces 2A, 2B also deconstruct the packets received through the communication lines 3A, 3B and output the data contained in the payload of the packets to the CPU 21.

For example, the serial interfaces 2A, 2B transmit control commands for executing a printing process, and the print data (recording data) containing the text, images, and symbols, for example, to be printed, to the printer 4 connected thereto through the communication lines 3A, 3B.

The serial interfaces 2A, 2B can also send and receive encrypted data through the communication lines 3A, 3B. In this configuration the serial interfaces 2A, 2B have a function for encrypting and packetizing data input from the CPU 21 and outputting the encrypted packets through the communication lines 3A, 3B, and for decrypting packets received through the communication lines 3A, 3B. The serial interfaces 2A, 2B also send and receive key information used for encryption and decryption in communication with the other terminal device (such as the printer 4) connected through the communication lines 3A, 3B.

The printer 4 has a control unit 41, memory 42, a gate array 43, an input unit 44, a display unit 45, and two serial interfaces 4A, 4B connected over a bus 47.

The control unit 41 executes firmware stored in memory 42, and controls the other parts of the printer 4 to render a printing function. The memory 42 stores the firmware and related data. The gate array 43 drives and controls sensors and motors. The input unit 44 is populated with switches and other devices, is connected to the operating panel (not shown in the figure) of the printer 4, detects operations at the operating panel, and outputs operating signals to the control unit 41. The display unit 45 is connected to an LED or LCD device disposed to the printer 4 housing, and displays, for example, the operating status of the printer 4 using these display devices.

The printer 4 prints text, symbols, images, or other content on a recording medium such as paper as controlled by the control unit 41. Recording media that can be used in the printer 4 include both cut sheet media that is cut to a predetermined length, and continuous sheet media. Examples of cut sheet media include slips, photocopier paper, bank passbooks, and precut film media. Examples of continuous sheet media include roll paper having a paper web wound into a roll, and fanfold paper separated into pages of a predetermined size by rendering perforations or folds in a continuous paper web. Note that this embodiment of the invention is described using a passbook having multiple bound pages as an example of the recording medium. This passbook also has a magnetic stripe in which information can be magnetically recorded.

The control unit 41 operates according to control commands sent from the host computer 2, controls other parts of the printer through the gate array 43 based on print data sent from the host computer 2, and prints text, images, or other content on the recording medium.

Connected to the gate array 43 are a paper end (PE) sensor 51 that detects the leading end and trailing end of the recording medium; a paper width (PW) sensor 52 that detects the widthwise edges of the recording medium; a transportation motor 53 that causes the transportation rollers to rotate and convey the recording medium; a carriage drive motor 54 that causes a carriage to move relative to the recording medium; a recording head 55 that prints on the recording medium; and a magnetic head 56 that reads information magnetically recorded in the magnetic stripe (not shown in the figure) disposed to the recording medium.

The gate array 43 supplies drive voltage to the PE sensor 51 and PW sensor 52 as controlled by the control unit 41. The gate array 43 also detects the output voltage resulting from this drive voltage, converts the detected voltage to digital data corresponding to the value detected by the corresponding sensor, and outputs the digital data to the control unit 41.

The gate array 43 also outputs a drive voltage and drive pulses to the transportation motor 53 and carriage drive motor 54, which are rendered by stepping motors, as controlled by the control unit 41, thereby causing the motors to turn while outputting a drive voltage to the recording head 55 to print. The gate array 43 also reads by means of the magnetic head 56 the magnetic information recorded on the magnetic stripe as controlled by the control unit 41, converts the read magnetic information to digital data, and outputs the digital data to the control unit 41.

The serial interfaces 4A, 4B are communication interfaces configured to communicate independently of each other, and each has a connector (not shown in the figure) conforming to a serial communication standard such as RS-232C or USB. Connector cables (not shown in the figure) rendering communication lines 3A, 3B can be connected to the connectors. The serial interfaces 4A, 4B send and receive data with the host computer 2 through the communication lines 3A, 3B rendered by these connection cables.

The serial interfaces 4A, 4B also deconstruct the packets received through the communication lines 3A, 3B and output the data contained in the packet payloads to the control unit 41.

When data to be transmitted is input from the control unit 41, the serial interfaces 4A, 4B convert the input data and produce packets conforming to the protocol defined by the relevant specification, and transmit the resulting packets through the communication lines 3A, 3B.

For example, the serial interfaces 4A, 4B interpret the packets sent from the host computer 2 through the communication lines 3A, 3B, and output the control commands and print data from the host computer 2 to the control unit 41.

The serial interfaces 4A, 4B can also send and receive encrypted data through the communication lines 3A, 3B. In this configuration the serial interfaces 4A, 4B have a function for decrypting packets received through the communication lines 3A, 3B and outputting the received packets to the control unit 41, and encrypting and packetizing data input from the control unit 41 and outputting the encrypted packets through the communication lines 3A, 3B, and for. The serial interfaces 4A, 4B also send and receive the key information used for encryption and decryption in communication with the other terminal device (such as the host computer 2) connected through the communication lines 3A, 3B.

Note that in the following description of the invention the host computer 2 and the printer 4 encrypt the data (including control commands) sent and received therebetween.

FIG. 2 and FIG. 3 show two ways that the host computer 2 and printer 4 can be connected. FIG. 2 shows an example in which the host computer 2 and printer 4 are connected by a single communication line 3A, and FIG. 3 shows an example in which the host computer 2 and printer 4 are connected by two communication lines 3A, 3B.

As shown in FIG. 2, when the host computer 2 and printer 4 are connected by one communication line 3A, the information exchanged over the single communication line 3A is, broadly speaking, recording data such as the print data, control information such as control commands, and security information such as the key information. Because the host computer 2 and printer 4 detect that they are connected by one communication line 3A and exchange three types of information over the communication line 3A, three virtual communication channels are created and these three communication channels are assigned to the one communication line 3A.

More specifically, as shown in FIG. 2, three virtual data channels, that is, data channel 31 (data communication channel), control channel 32 (control communication channel), and security channel 33, are rendered on one physical communication line 3A. The host computer 2 and printer 4 thus differentiate the data channel 31, the control channel 32, and the security channel 33 when communicating information with each other over the communication line 3A.

The data channel 31 functions as the transmission path for transmitting print data and data read from the magnetic stripe when the host computer 2 sends print data to the printer 4 and when the printer 4 sends data read from the magnetic stripe of the recording medium to the host computer 2.

The control channel 32 functions as the transmission path for transmitting control commands and status information when the host computer 2 sends control commands telling the printer 4 to start printing, for example, to the printer 4, and when the printer 4 returns status information in response to the control commands to the host computer 2.

The security channel 33 functions as the transmission path for transmitting hash codes and session keys between the host computer 2 and printer 4 when sending and receiving encrypted data.

As shown in FIG. 3, the host computer 2 and printer 4 may also be connected by two communication lines 3A, 3B. In this configuration the serial interface 2A of the host computer 2 and the serial interface 4A of the printer 4 are connected by communication line 3A, and serial interface 2B and serial interface 4B are connected by communication line 3B.

In this configuration the host computer 2 and printer 4 recognize they are connected by two communication lines 3A, 3B, and assign the above-described three communication channels to these communication lines 3A, 3B.

In this configuration only the data channel 31 is assigned to communication line 3A, which thus becomes a dedicated communication path for the data channel 31, and the other channels (control channel 32 and security channel 33 in this example) are assigned to communication line 3B. Because the data channel 31 carries significantly more data than the other channels, the time required for transmission can be effectively shortened by preferentially assigning thereto a communication channel with greater bandwidth or a higher bit rate than the other channels.

FIG. 4 and FIG. 5 show the structure of the packets that are exchanged by the host computer 2 and printer 4, FIG. 4 showing the structure of packets sent by the host computer 2 to the printer 4, and FIG. 5 showing the packet structure sent by the printer 4 to the host computer 2.

Figure 4A:
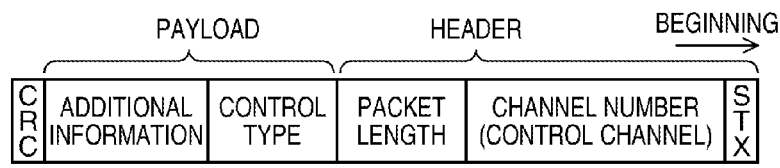
FIG. 4 shows the packet structure sent by the host computer.

FIG. 4A shows the structure of packets sent from the printer 4 over the control channel 32. The packets shown in FIG. 4A contain control string STX denoting the packet start, a header including a channel number denoting the channel and the packet length, and a payload including the type of control command and additional information.

The channel number is information identifying whether the channel on which the packet is transmitted is the data channel 31, control channel 32, or security channel 33, and this information in the packet shown in FIG. 4A indicates the control channel 32.

Figure 5A:
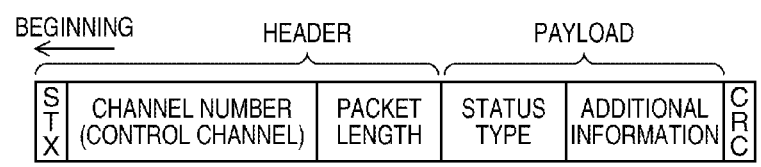
FIG. 5 shows the packet structure sent by the printer.

The structure of packets transmitted from the printer 4 to the host computer 2 in response to the packet shown in FIG. 4A is shown in FIG. 5A. The packet shown in FIG. 5A includes a control string STX, a header containing the channel number identifying the control channel 32 and the packet length, and a payload containing the printer 4 status and additional information.

Figure 4B:
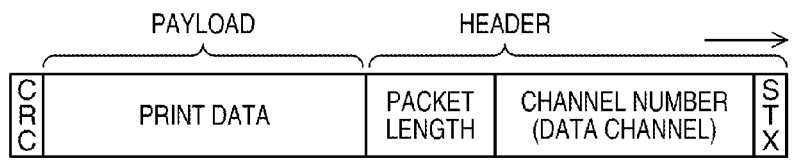

FIG. 4B shows the structure of packets sent from the host computer 2 to the printer 4 over the data channel 31. The packets shown in FIG. 4B contain the control string STX, a header including a channel number denoting the data channel 31 and the packet length, and a payload containing the print data.

Figure 5B:
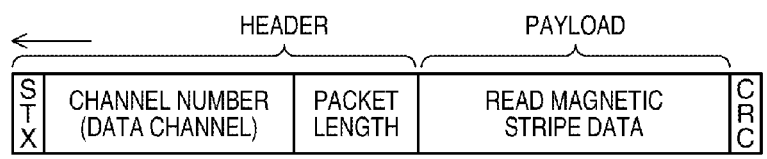

The structure of packets transmitted from the printer 4 to the host computer 2 in response to the packets shown in FIG. 4B is shown in FIG. 5B. The packets shown in FIG. 5B include the control string STX, a header containing a channel number denoting the data channel 31 and the packet length, and a payload containing the magnetic stripe data read by the printer 4 (the read magnetic stripe data).

Figure 4C:
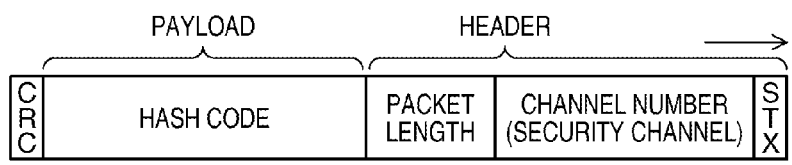

FIG. 4C shows the structure of packets transmitted from the host computer 2 to the printer 4 over the security channel 33. The packets shown in FIG. 4C include the control string STX, a header containing a channel number denoting the security channel 33 and the packet length, and a payload containing a hash code.

Figure 5C:
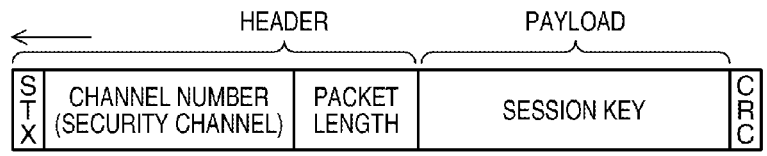
Figure 5D:
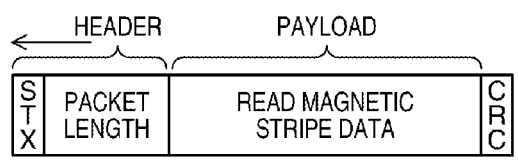

The structure of packets sent from the printer 4 to the host computer 2 in response to the packets shown in FIG. 4C is shown in FIG. 5C. The packets shown in FIG. 5C include the control string STX, a header containing a channel number denoting the security channel 33 and the packet length, and a payload containing the session key.

When the host computer 2 and printer 4 are connected by only one communication line 3A as shown in FIG. 2, the host computer 2 and printer 4 send and receive packets as shown in FIG. 4A to FIG. 4C and FIG. 5A to FIG. 5C.

However, because only the data channel 31 is assigned to communication line 3A when the host computer 2 and printer 4 are connected by two communication lines 3A, 3B as shown in FIG. 3, the packets sent and received by the CPU 21 of the host computer 2 controlling serial interface 2A, and the packets sent and received by the control unit 41 of the printer 4 controlling serial interface 4A, are only the packets that are sent and received over the data channel 31.

As a result, when the host computer 2 and printer 4 of the recording system 1 are connected by two communication lines 3A, 3B, the host computer 2 and printer 4 remove the channel number denoting the data channel 31 from the headers of the packets carried on the data channel 31.

Figure 4D:
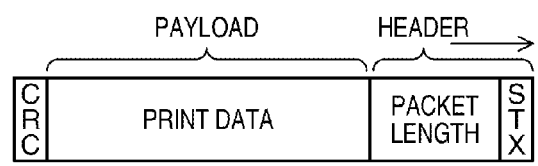

More specifically, FIG. 4D shows the structure of the packets containing the print data sent by the host computer 2 when the host computer 2 and printer 4 are connected by two communication lines 3A, 3B. As shown in FIG. 4D, the packet header contains the control string STX and the packet length, but does not contain the channel number. Likewise, the header of the packets shown in FIG. 5D that carry the read magnetic stripe data and are transmitted by the printer 4 do not contain the channel number.

Even though the packet header does not contain the channel number, communication line 3A and communication line 3B can be physically differentiated, and the channel cannot be mistaken because only the data channel 31 packets are sent and received over the communication line 3A.

Figure 6:
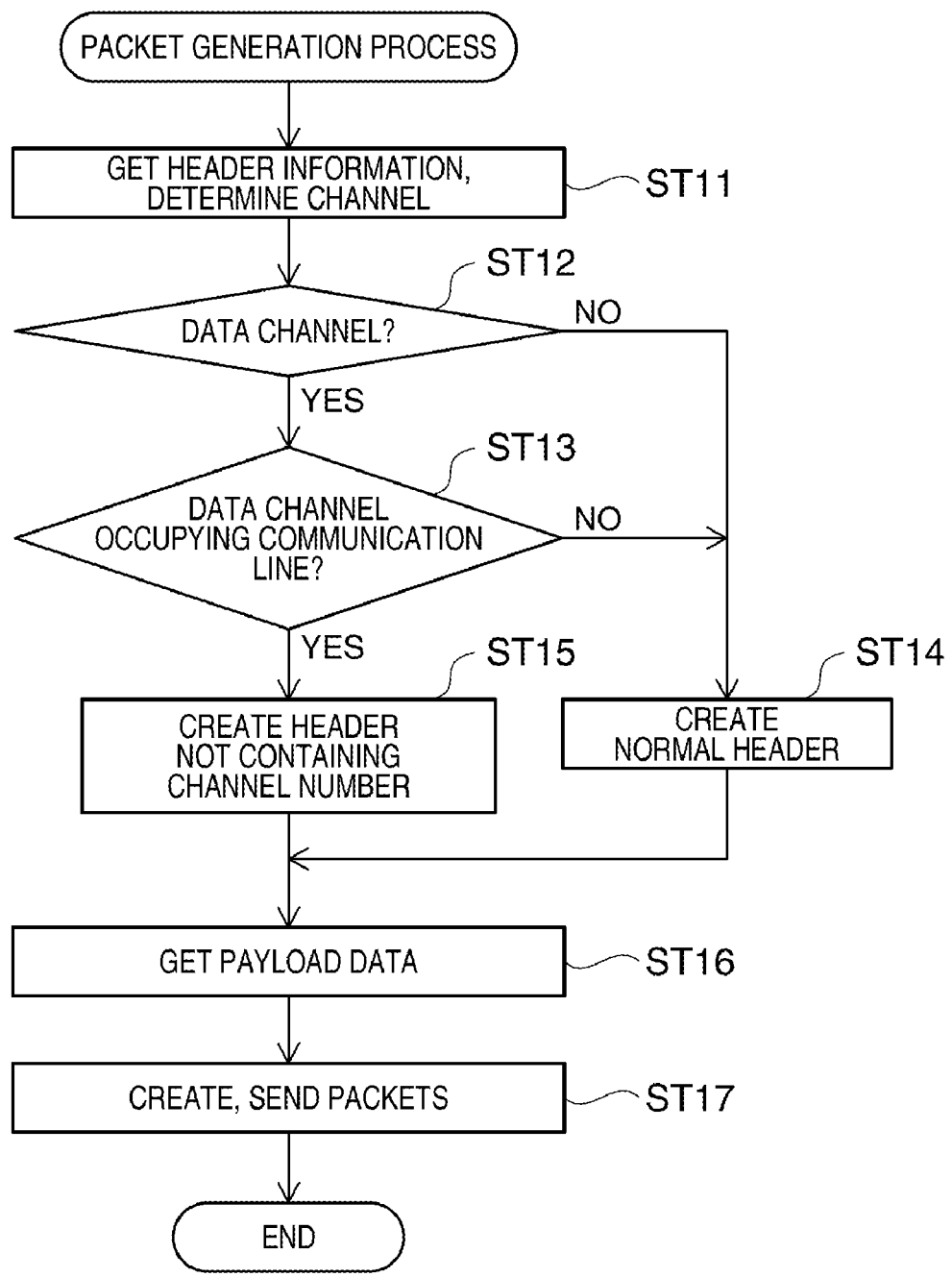
FIG. 6 is a flow chart describing the packet generating process of the recording system.

FIG. 6 is a flow chart showing the packet generation process that produces the packets in the recording system 1 according to this embodiment of the invention. This packet generation process is the operation that is executed when packets are produced and sent over the communication line 3A, and is common to the host computer 2 and printer 4.

When the CPU 21 of the host computer 2 produces packets by means of the serial interface 2A, the CPU 21 first acquires any additional information that should be added to the transmitted packets, and determines the channel over which to send the packets (step ST11).

The CPU 21 determines whether the channel to be used for transmission is the data channel 31 (step ST12), and skips to step ST14 if the communication channel is not the data channel 31 (step ST12 returns No).

If the communication channel is the data channel 31 (step ST12 returns Yes), the CPU 21 determines if the data channel 31 occupies the communication line 3A, that is, if the host computer 2 and printer 4 are connected by two communication lines 3A, 3B (step ST13). If the data channel 31 alone occupies the communication line 3A (step ST13 returns Yes), the CPU 21 produces a header that does not contain the channel number (step ST15), acquires the data to be carried in the packet payload (step ST16), the serial interface 2A generates a packet using the header produced in step ST15 and the payload acquired in step ST16, and transmits the packet through over the communication line 3A (step ST17).

If the data channel 31 alone does not occupy the communication line 3A (step ST13 returns No), the CPU 21 goes to step ST14.

In step ST14 the CPU 21 creates a normal header and then goes to step ST16. The CPU 21 then acquires the data to be contained in the packet payload in step ST16, creates a packet using the acquired payload and the header produced in step ST14, and transmits the packet over the communication line 3A by means of the serial interface 2A.

The process described in steps ST11 to ST17 above is executed the same when the control unit 41 of the printer 4 controls the serial interface 4A to produces packets transmitted from the serial interface 4A over the communication line 3A.

By thus assigning only the data channel 31 to communication line 3A and removing the channel number from the headers of packets communicated over this data channel 31 when the host computer 2 and printer 4 are connected by two communication lines 3A, 3B, the header can be shortened. The overhead in communication on the data channel 31 can therefore be reduced, and sending and receiving print data and read magnetic stripe data can actually be accelerated. Because the amount of data that is exchanged over the data channel 31 is greater than that on the control channel 32 and security channel 33 and transmission therefore requires more time, it can become a bottleneck for the recording system 1. However, by thus increasing the transmission speed of the data channel 31, the throughput of the recording system 1 can actually be improved.

Figure 7:
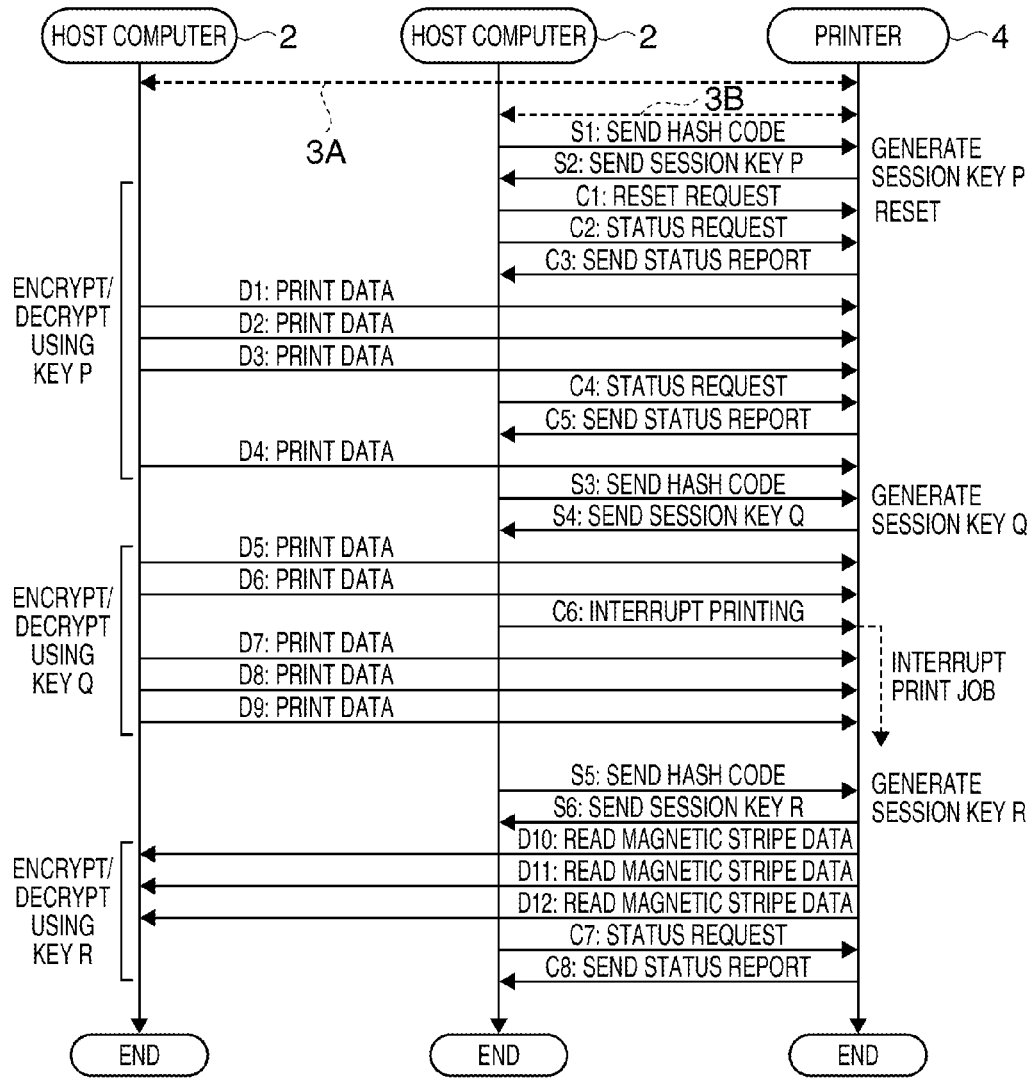
FIG. 7 describes the sequence of the communication operation of the recording system.

FIG. 7 is a sequence chart showing an example of the communication operation of the recording system 1.

The operation shown in FIG. 7 separates packet communication over communication line 3A and packet communication over communication line 3B.

In order to encrypt data for communication with the printer 4, the host computer 2 first sends a hash code over the security channel 33 to the printer 4 (S1). The printer 4 then generates and sends a session key P in response to the host computer 2 (S2).

Thereafter, the host computer 2 and printer 4 use the session key P as the encryption key and decryption key to encrypt and send data and to decrypt the received data.

More specifically, the host computer 2 sends a control command requesting the printer 4 to reset for initialization through the control channel 32 (C1), and then sends a control command through the control channel 32 requesting the printer 4 to return status information (C2). In response, the printer 4 resets and then returns a status report (C3).

The host computer 2 confirms from the status information returned by the printer 4 that the printer 4 reset successfully, and then sends the print data over the data channel 31 (D1 to D4). Because the amount of print data is generally large, the print data is commonly split into plural packets (indicated here by D1 to D4).

Each time a specific amount of print data is sent, the host computer 2 sends a control command requesting a status report to the printer 4 over the control channel 32 (C4), and the printer 4 returns a current status report (C5). This status request is to check that the printer 4 is printing normally and to get a progress report on printing the transmitted print data.

The packets transmitted in C1 to C5 and D1 to D4 above are sent with the payload encrypted using the session key P.

The host computer 2 then sends a new hash code to the printer 4 over the security channel 33 (S3), and in response the printer 4 generates and sends a new session key Q to the host computer 2 (S4).

Thereafter, the host computer 2 and printer 4 use the session key Q as the encryption key and decryption key to transmit the print data over the data channel 31 (D5 to D6).

In order to interrupt printing by the printer 4, the host computer 2 can send to the printer 4 over the control channel 32 a control command telling the printer 4 to interrupt printing (C6).

To resume printing after interrupting printing, the host computer 2 sends print data to the printer 4 over the data channel 31 (D7 to D9). The payload part of the packets sent and received in D5 to D9 and C6 is encrypted using session key Q.

To communicate more data, the host computer 2 sends another hash code to the printer 4 over the security channel 33 (S5), and in response the printer 4 generates and sends a new session key R to the host computer 2 (S6).

The host computer 2 and printer 4 then use this session key R as the encryption key and decryption key, and the printer 4 reads the magnetic information from the magnetic stripe on the recording medium, for example, and sends the read magnetic stripe data to the host computer 2 (D10 to D12).

As needed, the host computer 2 also sends a control command requesting a status report to the printer 4 over the control channel 32 (C7), and in response the printer 4 returns a status report (C8). The packets D10 to D12 and C7 to C8 that are sent and received after the session key R is exchanged are sent and received with the payload portion encrypted using session key R.

As shown in FIG. 7, because the packets that are sent and received over the control channel 32 and security channel 33, and the packets that are sent and received over the data channel 31, are carried on physically different communication lines 3A, 3B, they can be easily differentiated. As a result, communication can proceed smoothly because the packets are carried on different channels as shown in FIG. 7. In addition, because only the packets carried on the data channel 31 do not carry the channel number in the header, the overhead can be reduced when sending large amounts of print data and read magnetic stripe data that must be split into multiple packets as shown by example in FIG. 7, and the effective communication speed can be improved. Throughput can therefore also be improved.

As described above, a recording system 1 according to this first embodiment of the invention includes a printer 4 having a plurality of serial interfaces 4A, 4B that can communicate independently of each other, and a host computer 2 having a plurality of serial interfaces 2A, 2B that can communicate independently of each other, and uses physical communication lines that connect the serial interfaces 4A, 4B and serial interfaces 2A, 2B 1:1. A plurality of virtual communication channels including a data channel 31 and a control channel 32 are assigned to the communication lines, and information is sent and received in packets through the virtual communication channels. Furthermore, because only the data channel 31 is assigned to at least one of the plural communication lines 3A, 3B, specifically communication line 3A in this example, when the printer 4 and host computer 2 are connected through a plurality of communication lines 3A, 3B, the data channel 31 that carries a large amount of communication data occupies a single communication line 3A. As a result, by assuring the transmission speed of the data channel 31 preferentially to the other virtual communication channels, communication through the data channel 31, which can easily become a bottleneck, can be accelerated, and data can be communicated at high speed with the host computer 2 and printer 4 connected using an existing communication interface. In addition, the overall operating speed of the recording system can be increased, and throughput can be increased, by increasing the speed of communication over the data channel 31 that easily becomes a bottleneck.

When the printer 4 and host computer 2 are connected by one communication line 3A, packets having a header containing a channel number identifying the communication channel are generated and sent over the communication line 3A by packet communication. When the printer 4 and host computer 2 are connected by a plurality of communication lines 3A, 3B, the packets transmitted over the data channel 31 are packets that do not have the channel number in the header. Packet overhead can therefore be reduced, and the effective transmission speed of the data channel 31 can be increased.

Furthermore, because the print data, the amount of which is greater than control commands, that is sent from the host computer 2 to the printer 4 over the data channel 31 is transmitted over a data channel 31 that occupies at least one communication line 3A, the communication of print data that can easily become a bottleneck can be accelerated, the overall operating speed of the recording system 1 can be increased, and throughput can be improved.

Yet further, when the printer 4 and host computer 2 are connected through an existing standardized serial interface, the data communication rate can be actually increased without operations that deviate from the standard to increase the transmission speed.

The foregoing embodiment describes only one mode of achieving the invention, and various modifications and applications will be obvious to one with ordinary skill in the related art without departing from the scope of the accompanying claims. For example, the foregoing first embodiment describes a configuration in which the data channel 31 occupies one communication line 3A and the control channel 32 and security channel 33 are assigned to one communication line 3B by way of example.

However, the invention is not so limited, and the control channel 32 and security channel 33 may each be assigned to a single communication line.

The serial interfaces 2A, 2B, 4A, 4B are also not limited to an RS-232C serial interface, and may be a USB interface, SATA interface, or other interface that conforms to a different standard. Further alternatively, interfaces 2A, 2B, 4A, 4B are not limited to a serial interface, and may be a parallel interface such as an interface conforming to the IEEE 1284 standard.

Yet further, the information that is sent and received over the data channel 31, control channel 32, and security channel 33 is not limited to the information described above. For example, the control channel 32 may be a channel that sends and receives information indicating if the host computer 2 and printer 4 are ready to receive packets from the other device. This configuration has the advantage of being able to check if the other terminal is ready to receive before sending the packets.

Yet further, the communication lines 3A, 3B that connect the host computer 2 and printer 4 in the foregoing embodiment are described as wired communication lines using connector cables, but the invention is not so limited. For example, the serial interfaces 2A, 2B, 4A, 4B may have an RF circuit and antenna for wireless communication, and be configured for wireless communication over communication lines 3A, 3B rendered as wireless communication paths.

Embodiment 2

Figure 8:
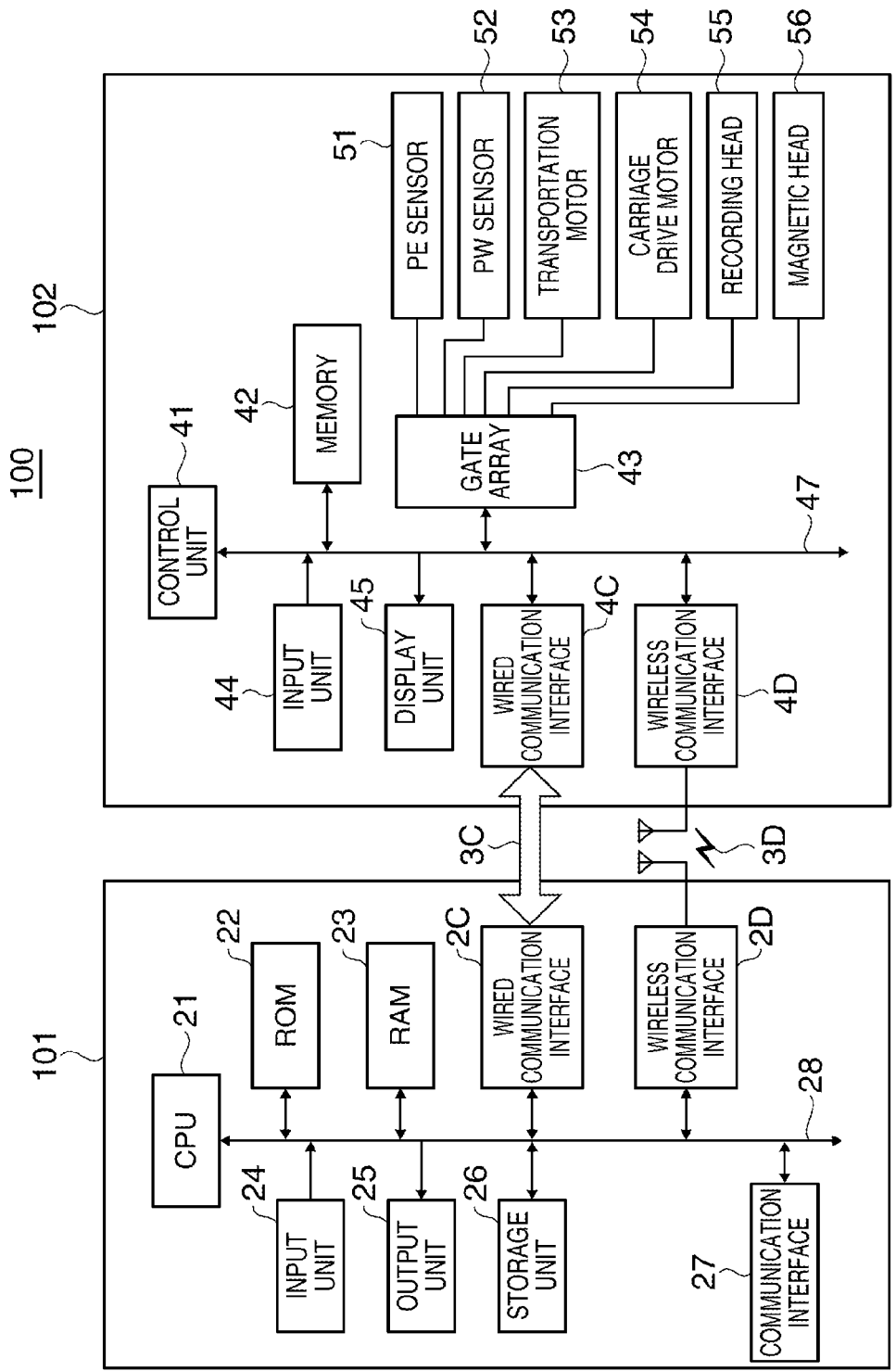
FIG. 8 is a function block diagram of a recording system according to a second embodiment of the invention.

FIG. 8 is a function block diagram of a recording system 100 according to a second embodiment of the invention.

In the following descriptions of the second to fifth embodiments of the invention, parts that are functionally the same as like parts in the first embodiment are identified by the same reference numerals, and further description thereof is omitted below.

The recording system 100 shown in FIG. 8 includes a host computer 101 and a printer 102 connected thereto as a recording device. The host computer 101 is substantially the same as the host computer 2 described above except that the serial interfaces 2A, 2B of the foregoing host computer 2 are replaced by a wired communication interface 2C and a wireless communication interface 2D.

The printer 102 is likewise substantially the same as the foregoing printer 4, and differs in that the serial interfaces 4A, 4B of the foregoing printer 4 are replaced by a wired communication interface 4C and wireless communication interface 4D.

The wired communication interfaces 2C and 4C are connected by a communication cable, and a communication line 3C, which is a wired communication path, is rendered by this communication cable.

The wireless communication interfaces 2D and 4D send and receive wireless signals through an antenna, and thus render a wireless communication line 3D, which is a wireless communication path.

The wired communication interfaces 2C, 4C can be rendered using a communication interface conforming to a standard such as Ethernet (R), RS-232C, IEEE-1284, or USB, and are not limited to any particular specification.

The wireless communication interfaces 2D, 4D can be rendered using a communication interface conforming to a wireless communication standard such as a wireless LAN standard such as IEEE 802.11 (including IEEE 802.11a, b, g, n, j), Wireless USB, ZigBee (R), UWB (Ultra Wide Band), and Bluetooth (R), and are not limited to any particular specification.

The host computer 101 and printer 102 send and receive three types of information over the communication line 3C and wireless communication line 3D, recording data such as the print data, control information such as control commands, and security information such as key information. The host computer 101 and printer 102 detect that they are connected by two communication lines, communication line 3C and wireless communication line 3D in this embodiment, and assign three virtual communication channels for sending and receiving the three types of information on the communication line 3C and wireless communication line 3D.

Figure 9:
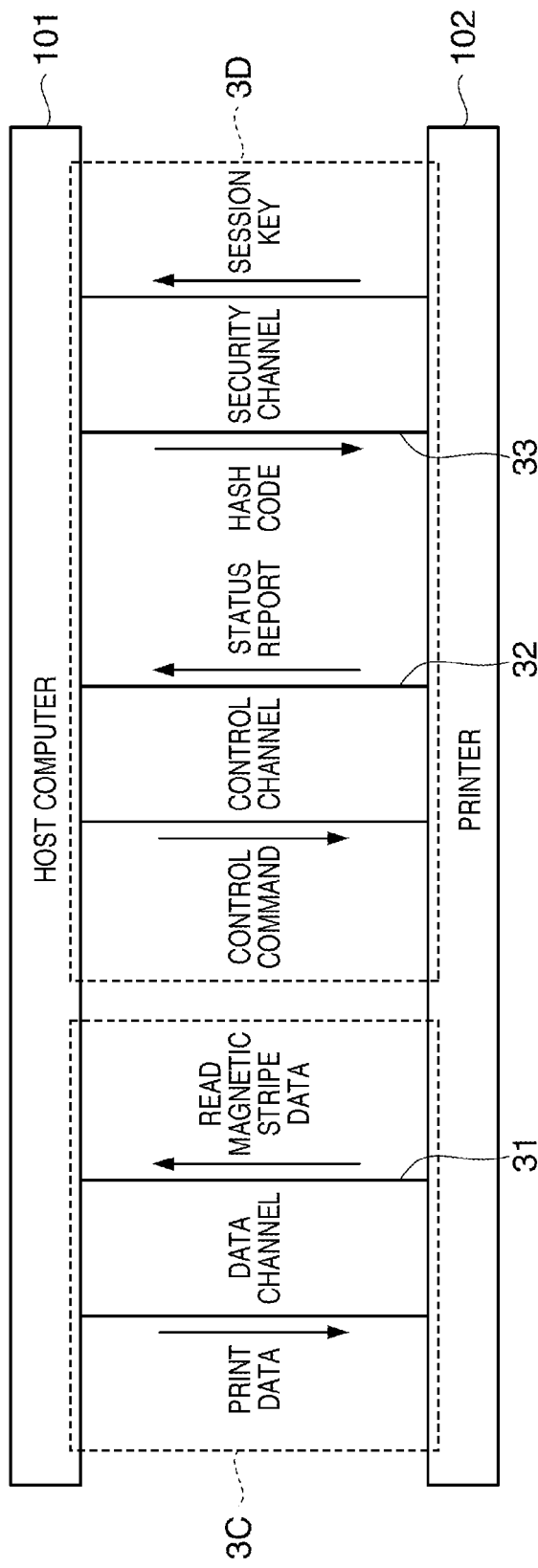
FIG. 9 shows an example of the connection between the host computer and printer according to a second embodiment of the invention.

More specifically, as shown in FIG. 9, data channel 31 (data communication channel), which is a virtual communication channel, is assigned to communication line 3C, and control channel 32 (control communication channel) and security channel 33 are assigned on the wireless communication line 3D.

When exchanging information with each other over the communication line 3C and wireless communication line 3D, the host computer 101 and printer 102 differentiate the data channel 31, control channel 32, and security channel 33, and generate and transmit packets such as shown in FIG. 4 and FIG. 5 over the communication channels.

Figure 10:
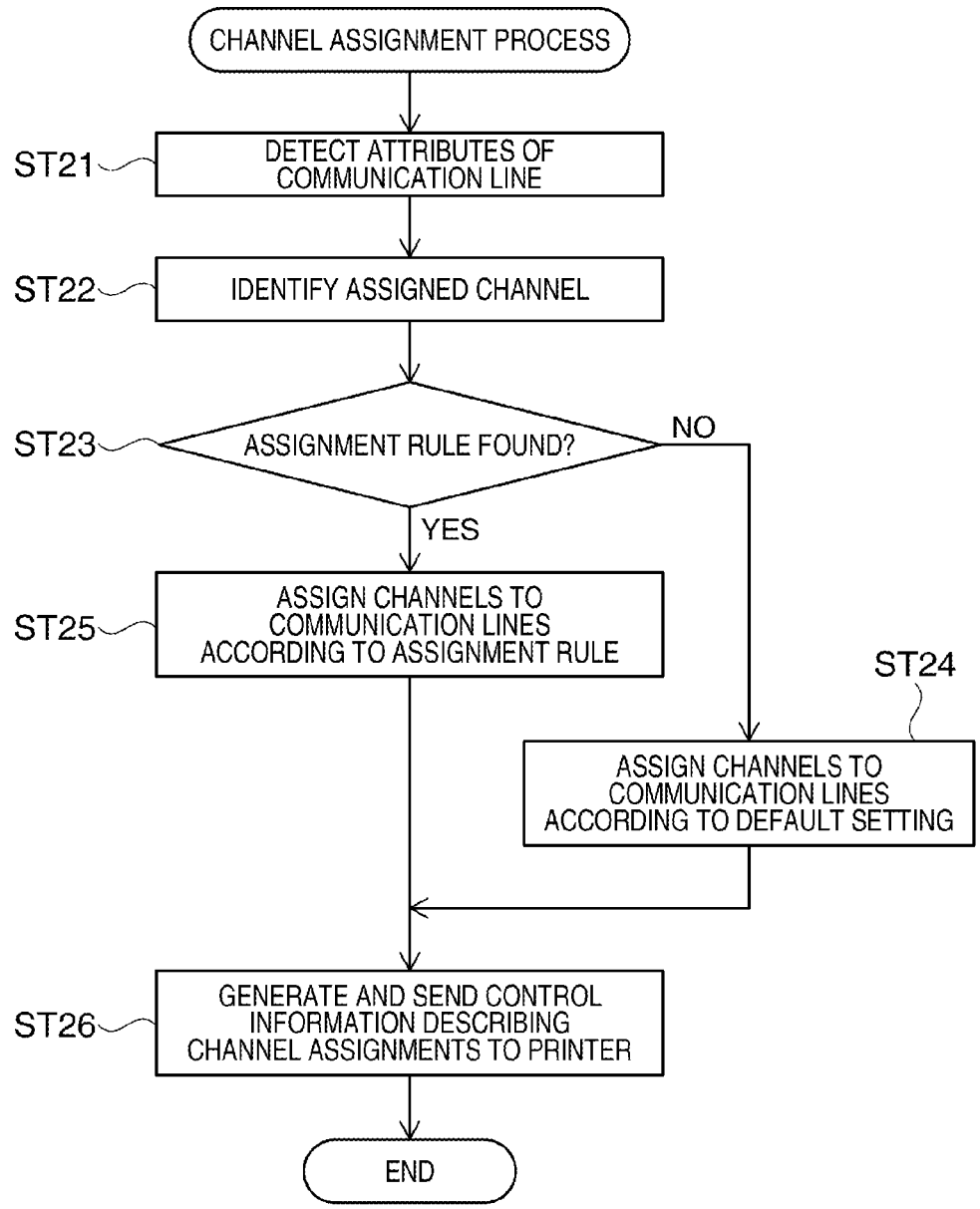
FIG. 10 is a flow chart showing the operation of the host computer.

FIG. 10 is a flow chart showing the channel assignment process for assigning the data channel 31, control channel 32, and security channel 33 to the communication line 3C and wireless communication line 3D. This channel assignment process is executed by the host computer 101, for example.

The CPU 21 of the host computer 101 implements a specific communication protocol for communication between the wired communication interface 2C and wireless communication interface 2D and the corresponding wired communication interface 4C and wireless communication interface 4D. When it is detected that a communication channel has been established over the communication line 3C and wireless communication line 3D, the attributes of the communication paths with the printer 102 are detected and acquired (step ST21). The CPU 21 then identifies the communication channels to be assigned to each communication path with the printer 102 (step ST22). More specifically, the CPU 21 determines how to assign the above three communication channels, data channel 31, control channel 32, and security channel 33, to the communication line 3C and wireless communication line 3D.

The CPU 21 therefore determines if there are assignment rules predefined for assigning the communication channels (step ST23). These assignment rules are rules defining the method or assignment pattern for assigning a plurality of communication channels to plural communication lines, and are stored, for example, in ROM 22 or RAM 23 in the host computer 101.

More specifically, which communication channel is assigned to which communication line is defined by these assignment rules based on the attributes of the communication line connecting the host computer 101 and printer 102, and the characteristics of the assigned communication channels.

The attributes of the communication line include, for example, the physical characteristics of the communication line (such as wired or wireless, and the cable specifications), or the specifications of the communication protocol used on each communication line (such as the bit rate (including theoretical), packet size, encoding method, encryption method, and security level). The characteristic of the communication channels include the type of information carried on each communication channel (such as print data or control information), and such specifications as the data capacity of each communication channel, packet size, and packet structure.

For example, when a communication channel is assigned to both a wired communication line and a wireless communication line in this second embodiment of the invention, an assignment rule that assigns the data channel 31 to the wired communication line, and assigns the control channel 32 and security channel 33 to the wireless communication line, is stored in ROM 22.

If there are no assignment rules (step ST23 returns No), the CPU 21 assigns the data channel 31, control channel 32, and security channel 33 to the communication line 3C and wireless communication line 3D according to the default setting related to communication channel assignment (step ST24). The default setting may, for example, assign the data channel 31, control channel 32, and security channel 33 to the communication line 3C and wireless communication line 3D in the ascending order of the device identification information of the wired communication interface 2C and wireless communication interface 2D. Alternatively, the data channel 31, control channel 32, and security channel 33 may be randomly assigned to the communication line 3C and wireless communication line 3D.

When assignment rules are predefined (step ST23 returns Yes), the CPU 21 assigns the communication channels to the communication lines according to the rules (step ST25).

After the communication channels are assigned in step ST24 or step ST25, the CPU 21 generates and sends control information describing the assignment of communication channels to communication lines to the printer 102 over the control channel 32 or over all communication channels (step ST26).

The printer 102 receives this control information, and if the communication channel assignments are the same on the host computer 101 and printer 102, the CPU 21 ends this process. The information exchanged between the host computer 101 and printer 102 after this channel assignment process is carried over the assignments resulting from step ST24 or step ST25.

In this second embodiment of the invention the print data sent from the host computer 101 to the printer 102, and the read magnetic stripe data read from the magnetic stripe by the printer 102, are transmitted over the data channel 31 on the communication line 3C. Other control information is sent and received over the wireless communication line 3D by the control channel 32 and security channel 33.

The printer 102 and host computer 101 thus have a plurality of wireless communication interfaces 2C, 2D, 4C, 4D rendering communication paths with different attributes, and these plural communication interfaces render a plurality of communication paths, specifically communication line 3C and wireless communication line 3D, with different attributes. The communication channels are then assigned based on the attributes of the communication lines to the communication line 3C and wireless communication line 3D. The characteristics of each communication path can therefore be used for efficient, highly practical communication over plural communication paths, such as a wired communication line 3C and wireless communication line 3D, with different attributes rendered between the host computer 101 and printer 102.

More specifically, the plural communication interfaces disposed to the printer 102 and host computer 101 in the recording system 100 described above include wired communication interfaces 2C, 4C rendering a wired communication line 3C and wireless communication interfaces 2D, 4D rendering a wireless communication line 3D, and a wired communication line 3C and a wireless communication line 3D are rendered between the printer 102 and host computer 101. A plurality of virtual communication channels, specifically data channel 31, control channel 32, and security channel 33, are then assigned to the plural communication paths including this wired communication line 3C and wireless communication line 3D. As a result, communication channels can be assigned to use the different features of both wired and wireless communication paths to achieve efficient, highly practical communication.

More specifically, because data channel 31 is assigned to the wired communication line 3C, and the control channel 32 and security channel 33 are assigned to the wireless communication line 3D, the effort needed to lay and connect communication cables can be eliminated by using the wireless communication line 3D. In addition, by assigning the data communication channel to a wired communication line 3C with high data security, the security of the print data and read magnetic stripe data sent and received between the host computer 101 and printer 102 can be assured. In addition, because a high bit rate can be easily achieved on the communication line 3C, the throughput of the recording system 100 can be improved by using the communication line 3C to send and receive print data, for example.

Embodiment 3

Figure 11:
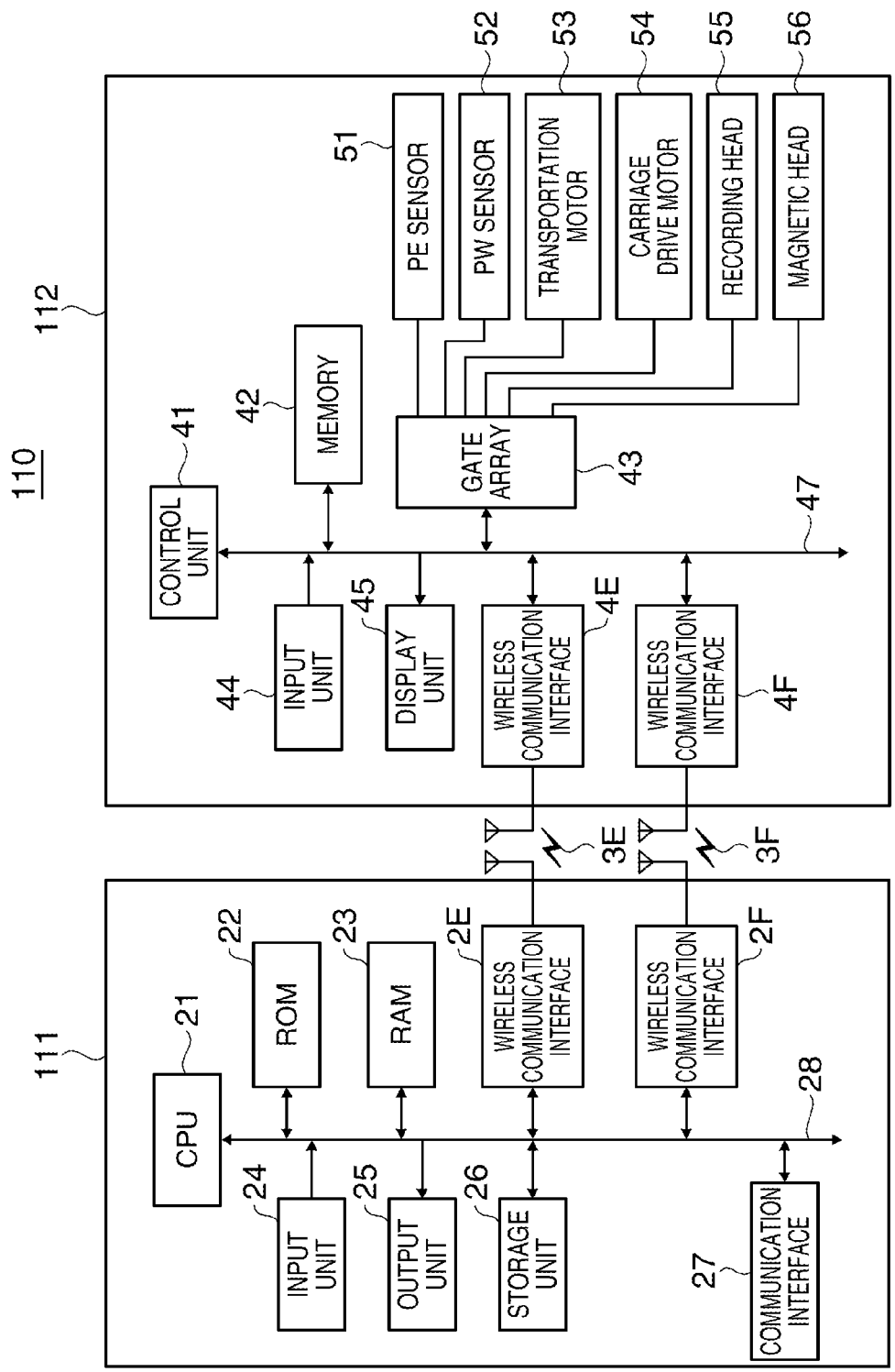
FIG. 11 is a function block diagram of a recording system according to a third embodiment of the invention.

FIG. 11 is a function block diagram of a recording system 110 according to a third embodiment of the invention.

The recording system 110 shown in FIG. 11 includes a host computer 111 and a printer 112 connected thereto as a recording device. The host computer 111 is substantially the same as the host computer 2 described above except that the serial interfaces 2A, 2B of the host computer 2 are replaced by wireless communication interfaces 2E and 2F. The printer 112 is also configured substantially the same as the foregoing printer 4, except that the serial interfaces 4A, 4B of the printer 4 are replaced by wireless communication interfaces 4E, 4F. The wireless communication interfaces 2E, 2F, 4E, 4F render wireless communication lines 3E, 3F by sending and receiving wireless signals through an antenna.

Note that the wireless communication interfaces 2E, 2F, 4E, 4F can be rendered using a wireless LAN conforming to an IEEE 802.11x specification, Wireless USB, ZigBee, UWB, Bluetooth or other communication interface conforming to various other wireless communication standards, and are not limited to any particular specification.

The host computer 111 and printer 112 send and receive three types of information, that is, recording data such as print data, control information such as control commands, and security information such as key information, over a data channel 31, control channel 32, and security channel 33 that are assigned to the wireless communication lines 3E, 3F. The CPU 21 of the host computer 111 executes the channel assignment process shown in FIG. 10, and assigns the communication channels to the wireless communication lines 3E, 3F.

Assignment rules that take into account differences in the attributes of wireless communication line 3E and wireless communication line 3F are stored in ROM 22 in the host computer 111.

FIG. 12 shows an example of the attributes of the wireless communication lines 3E, 3F. When the attributes of the wireless communication lines 3E, 3F are detected in the channel assignment process (FIG. 10), the CPU 21 stores the detected attributes in a table format such as shown in FIG. 12. As shown in FIG. 12, the attributes of the wireless communication lines 3E, 3F may include the wireless communication standard to which the channel conforms, the bit rate (the theoretical maximum communication speed), the encryption method, and the security level. A wireless communication interface device normally conforms to an internationally standardized specification in order to not create problems with compatibility or regulations related to spectrum use. Because most specifications define the bit rate and encryption method, the other attributes can be easily determined once the standard of the wireless communication interface is detected. Note, however, that because there are wireless communication interfaces that switch between multiple bit rates according to the communication environment, the CPU 21 may detect the actual bit rate instead of the theoretical maximum bit rate of the communication standard.

The security level is an indicator of the robustness of the security of the wireless communication channel, and is preset and stored in ROM 22, for example. The security level is not generally an attribute, but by using the security level as a unique attribute in the recording system 110, the communication channels can also be assigned based the robustness of channel security.

FIG. 13 shows an example of the assignment rules. A plurality of assignment rules are defined in the example shown in FIG. 13, and the CPU 21 selects and applies one of the rules to the channel assignment process. For example, when the security level is detected as an attribute of the wireless communication lines 3E, 3F, assignment rule No. 1 based on the security level is applied, and when the security level is not detected, assignment rule No. 2 based on the bit rate is applied.

Figure 14:
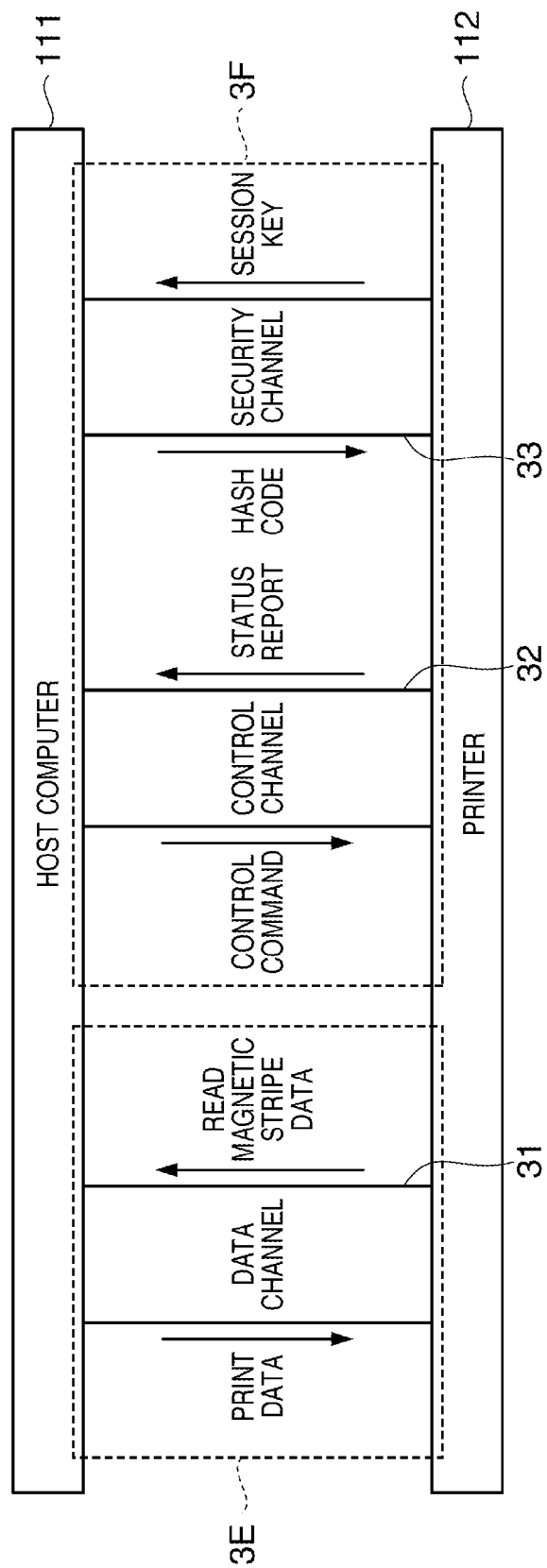
FIG. 14 shows an example of the connection between the host computer and printer according to a third embodiment of the invention.

FIG. 14 shows an example of communication channel assignments when assignment rule No. 1 in FIG. 13 is applied.

In the example shown in FIG. 14, the data channel 31 is assigned to wireless communication line 3E, and the control channel 32 and security channel 33 are assigned to wireless communication line 3F. When wireless communication line 3E corresponds to No. 2 in FIG. 12 and the security level thereof is stronger than wireless communication line 3F, the communication channels are assigned as shown in FIG. 14 based on assignment rule No. 1 in FIG. 13.

When the printer 112 and host computer 111 thus have wireless communication interfaces 2E, 2F, 4E, 4F rendering communication paths with different attributes, and these plural communication interfaces render a plurality of wireless communication lines 3E, 3F with different attributes, the communication channels are assigned to these wireless communication lines 3E, 3F based on the attributes of each communication path. As a result, the characteristics of each communication line can be used to enable for efficient, highly utilitarian communication over a plurality of wireless communication lines 3E, 3F of different attributes rendered between the host computer 111 and printer 112.

In other words, the recording system 110 renders a plurality of wireless communication lines 3E, 3F by means of a plurality of wireless communication interfaces 2E, 2F, 4E, 4F, and based on the relative bit rate and the relative security level denoting the robustness of communication security, assigns the data channel 31, control channel 32, and security channel 33 to the wireless communication lines 3E, 3F. Efficient communication is thus enabled by using differences in the possible bit rates or relative security levels of the wireless communication paths. As a result, system throughput can be improved by assigning communication channels according to the maximum possible communication speed, and robust security can be assured by assignment according to the relative strength of the security levels.

Embodiment 4

Figure 15:
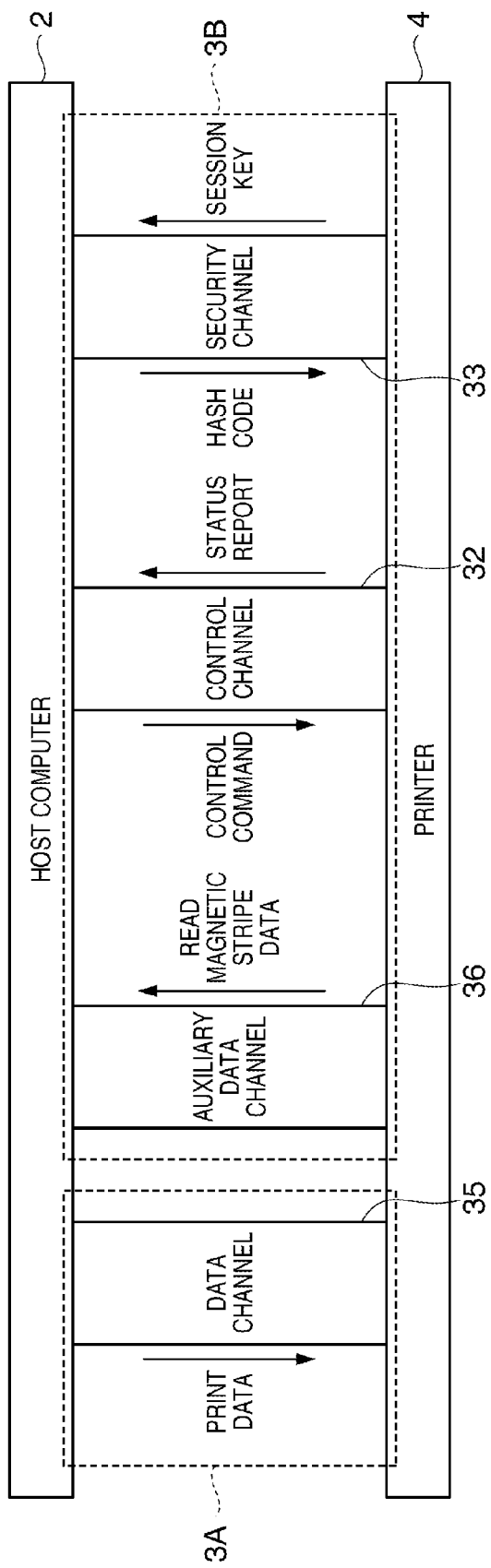
FIG. 15 shows an example of the connection between the host computer and printer according to a fourth embodiment of the invention.

FIG. 15 shows a connection between the host computer 2 and printer 4 as an example of the configuration of a recording system according to a fourth embodiment of the invention.

This fourth embodiment differs from the recording system 1 having a host computer 2 and printer 4 according to the foregoing first embodiment in that data channel 35 and auxiliary data channel 36 are assigned as data communication channels instead of data channel 31 in the first embodiment.

Like the foregoing data channel 31, this data channel 35 and auxiliary data channel 36 are communication channels for sending and receiving data other than information such as control commands and hash codes between the host computer 2 and printer 4.

Unlike data channel 31, data channel 35 is not used for sending data that is read from a magnetic stripe by the printer 4. The auxiliary data channel 36 also differs from the data channel 31, and is not used by the host computer 2 for sending print data.

As shown in FIG. 15, the data channel 35 is assigned to communication line 3A, and the auxiliary data channel 36 is assigned to communication line 3B. More specifically, the data channel 35 and auxiliary data channel 36 are data communication channels but are assigned to physically different communication paths.

Figure 16:
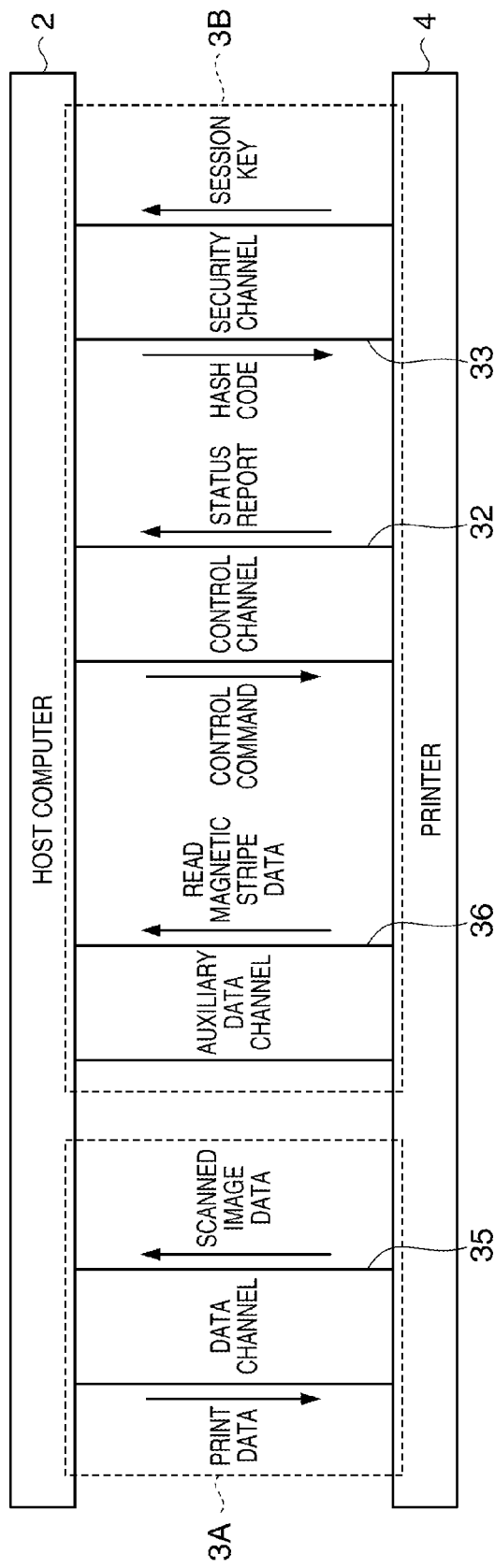
FIG. 16 shows another example of the connection between the host computer and printer according to a fourth embodiment of the invention.

FIG. 16 shows a connection between the host computer 2 and printer 4 as another possible configuration of the fourth embodiment.

In the configuration shown in FIG. 16, the data channel 35 is also used by the printer 4 for sending scanned image data to the host computer 2. More specifically, the printer 4 in this embodiment has a scanner (not shown in the figure) that optically reads the surface of one or both sides of the recording medium, and the printer 4 scans one or both sides of the recording medium when printing and sends the captured image data to the host computer 2. The data channel 35 assigned to communication line 3A is used as the communication channel for transmitting the scanned image data in this situation.

This fourth embodiment of the invention thus types the data transmitted over the data communication channel into print data and read magnetic stripe data based on the data attributes, and transmits data over communication channels that differ by data type. In addition, when sending and receiving scanned image data, the scanned image data is grouped separately from the print data and read magnetic stripe data and is sent and received over data channel 35, for example. Because this data channel 35 occupies communication line 3A, faster communication is possible than on the control channel 32 and security channel 33. As a result, print data and scanned image data, which both involve a large amount of data, are sent and received on data channel 35, and read magnetic stripe data, which is relatively small in amount, is transmitted over a auxiliary data channel 36 that is assigned with the control channel 32 and security channel 33 to communication line 3B.

Data that is transmitted is thus grouped by attribute, and is sent and received over communication channels that differ by attribute. In other words, transmission switches between data channel 35 and auxiliary data channel 36 according to the attributes of the transmitted data. As a result, a plurality of communication channels can be used efficiently to improve communication efficiency, improve throughput, and stabilize system operation. In addition, the data channel 35 and auxiliary data channel 36 can be assigned to different communication lines and the communication lines can be used selectively according to the data attributes, promoting even more efficient communication, improving throughput, and improving the stability of system operation.

Embodiment 5

Figure 17:
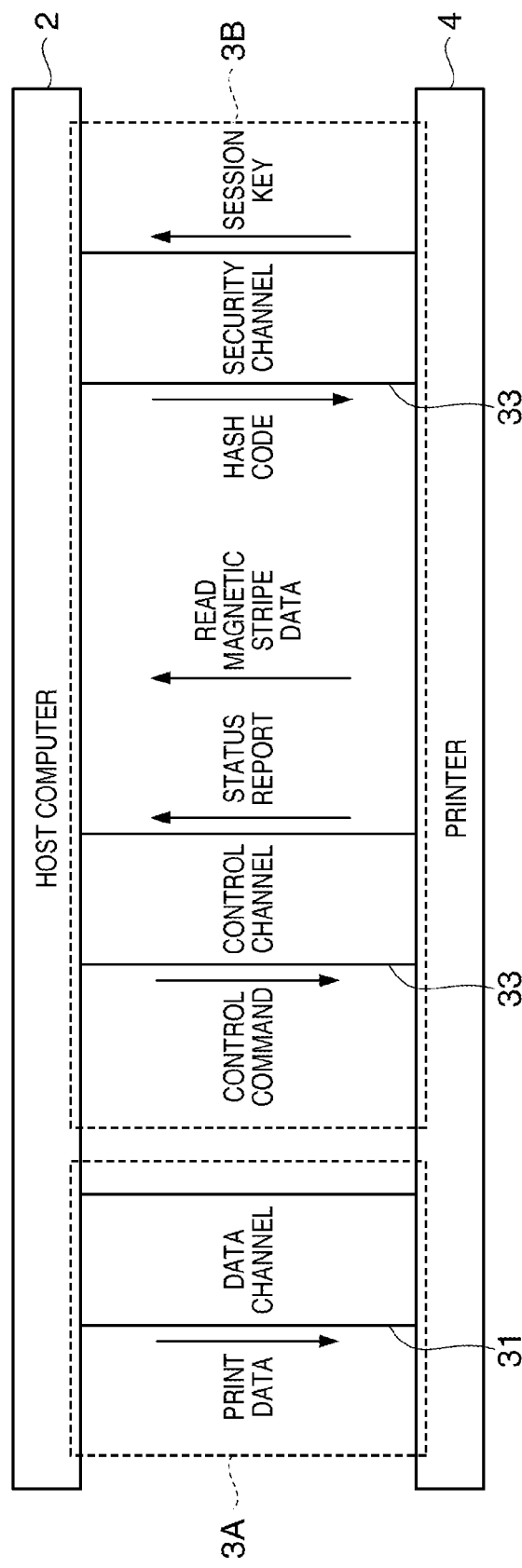
FIG. 17 shows an example of the connection between the host computer and printer according to a fifth embodiment of the invention.

FIG. 17 shows the connection of a host computer 2 and printer 4 according to the configuration of a recording system according to a fifth embodiment of the invention.

As described in the recording system 1 having a host computer 2 and printer 4 according to the foregoing first embodiment of the invention, data channel 31 is assigned to communication line 3A, and control channel 32 and security channel 33 are assigned to communication line 3B in this fifth embodiment of the invention. With the fifth embodiment of the invention thus comprised, magnetic stripe data read by the printer 4 from the recording medium is transmitted through the control channel 32 to the host computer 2.

By thus using the control channel 32 on which control commands and status responses are sent and received to send and receive the magnetic stripe data, the volume of which is small, the amount of data passing through the data channel 31 can be reduced and the bandwidth available for print data transmission can be increased by a corresponding amount. The print data can therefore be transmitted at high speed by typing the data sent and received over the data channel 31 by attribute, using the data channel 31 to carry print data, which is voluminous and should be prioritized for transmission, and transmitting other data over a separate communication channel.

Embodiment 6

Figure 18:
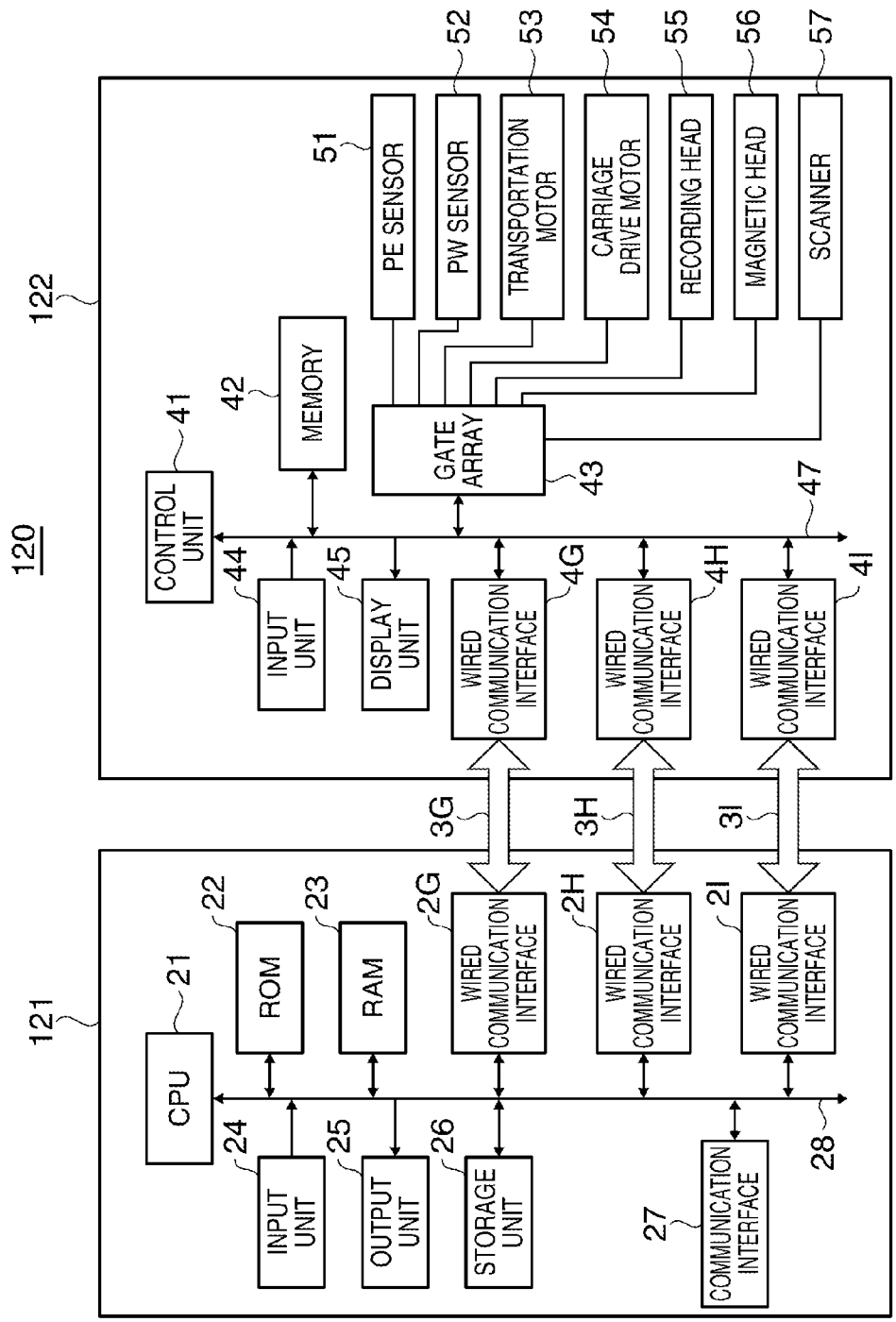
FIG. 18 is a function block diagram of a recording system according to a sixth embodiment of the invention.

FIG. 18 is a function block diagram of a recording system 120 according to a sixth embodiment of the invention.

The recording system 120 shown in FIG. 18 includes a host computer 121 and a printer 122 connected thereto as a recording device.

This host computer 121 is similar to the host computer 2 described above, and differs by having three wired communication interfaces 2G, 2H, 2I instead of the serial interfaces 2A, 2B of the foregoing host computer 2. The printer 122 is similarly substantially the same as the foregoing printer 4, and differs by having wired communication interfaces 4G, 4H, 4I, instead of the serial interfaces 4A, 4B of the above printer 4.

These wired communication interfaces 2G, 2H, 2I, 4G, 4H, 4I can use a communication interface that conforms to a variety of standards including Ethernet, RS-232C, IEEE 1284, and USB, and are not limited to any particular specification.

The recording system 120 also renders communication lines 3G, 3H, 3I, which are wired communication paths, between the host computer 121 and printer 122 by means of the wired communication interfaces 2G, 2H, 2I, 4G, 4H, 4I.

The host computer 121 and printer 122 assign data channel 35, auxiliary data channel 36, control channel 32 and security channel 33 to the communication lines 3G, 3H, 3I, and exchange three types of information, that is, data such as the print data and read magnetic stripe data, control information such as control commands, and security information such as key information. The CPU 21 of the host computer 121 executes the channel assignment process shown in FIG. 10, and assigns the communication channels to the communication lines 3G, 3H, 3I.

The printer 122 also has a scanner 57 connected to the gate array 43. The scanner 57 is a device that is disposed to the transportation path that carries the recording medium through the printer 122, and optically reads the surface of one or both sides of the recording medium. The printer 122 drives the scanner 57 by means of the gate array 43 as controlled by the control unit 41, reads one or both sides of the recording medium when printing, acquires the image data of the scanned image by means of the control unit 41, and sends the scanned image data to the host computer 121.

Figure 19:
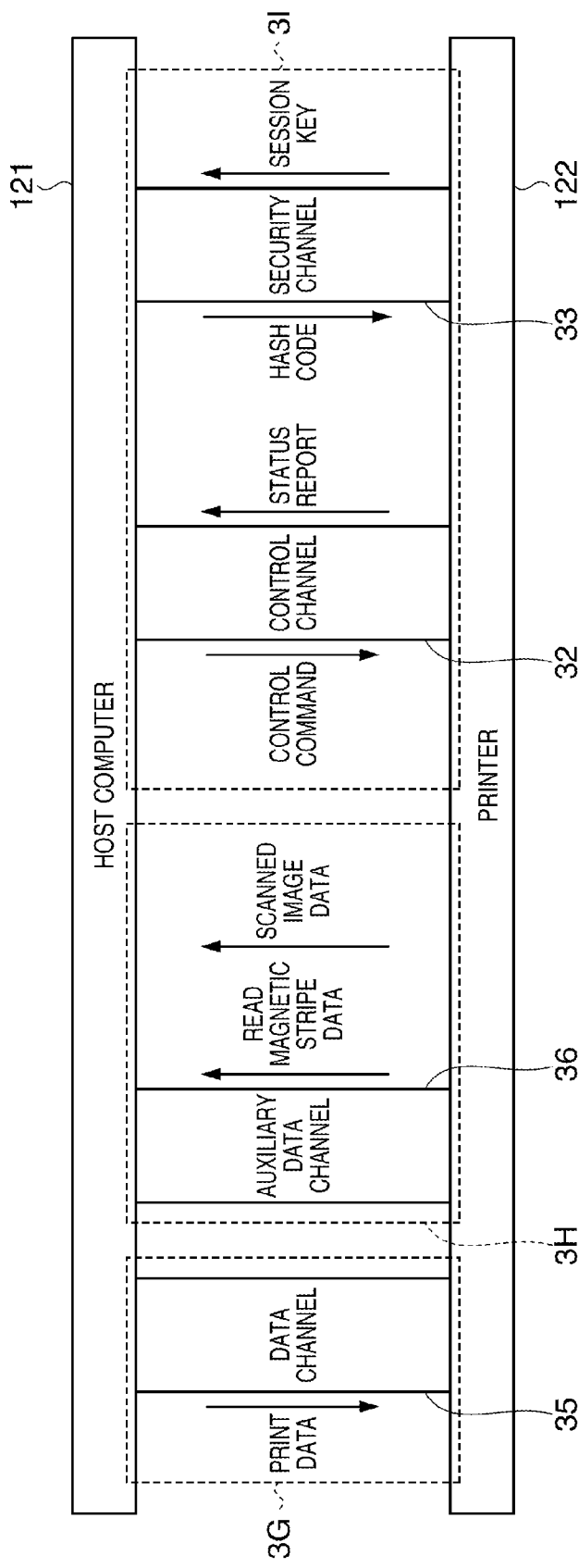
FIG. 19 shows an example of the connection between the host computer and printer according to a sixth embodiment of the invention.

FIG. 19 shows an example of the connection between the host computer 121 and printer 122, and shows the assignment of communication channels to the communication lines 3G, 3H, 3I.

As shown in FIG. 19, data channel 35 is assigned to communication line 3G, and print data is sent through this data channel 35 from the host computer 121 to the printer 122.

The auxiliary data channel 36 is assigned to communication line 3H, and the read magnetic stripe data and scanned image data is sent through this auxiliary data channel 36 from the printer 122 to the host computer 121.

In other words, when the information that is sent and received between the host computer 121 and printer 122 belongs to three general types, that is, print data and other recording data, control information such as control commands, and security information such as key information, the recording system 120 types and transmits the print data, read magnetic stripe data, and scanned image data that is similarly grouped as data by attribute over communication lines that differ according to data type. These types can also be considered the result of typing data as data that is sent from the host computer 121 to the printer 122, and data that is sent from the printer 122 to the host computer 121. By thus grouping data by attribute and transmitting the data over different communication channels and communication lines, bandwidth can be desirably assigned according to attribute type, and throughput can be improved by transmitting large amounts of data over a communication channel with a large bandwidth. Robust security can also be assured by exchanging confidential data over a highly secure communication line.

When the communication lines 3G, 3H, 3I are communication lines that differ by such attributes as bit rate, encryption method, and security level, the assignment rules based on the attributes of the communication lines 3G, 3H, 3I can be applied in the channel assignment process shown in FIG. 10.

In this configuration assignment rules corresponding to the differences in the attributes of the communication lines 3G, 3H, 3I are preset in the host computer 121 and stored in ROM 22.

When the attributes of the communication lines 3G, 3H, 3I are detected in the channel assignment process (FIG. 10), the CPU 21 applies the assignment rules based on the attributes and can assign the control channel 32, security channel 33, data channel 35, and auxiliary data channel 36 based on the bit rate and security level of the communication lines 3G, 3H, 3I. The CPU 21 also assigns the data channel 35 and auxiliary data channel 36 based on the attributes of the data transmitted over the data channel 35 and auxiliary data channel 36. As a result, the communication channels and transmitted data can be suitably assigned to reflect the attributes of the communication lines and the attributes of the data. Therefore, by optimally using the data channel 35 and auxiliary data channel 36 according to the attributes of the data and the attributes of the communication lines 3G, 3H, 3I, the characteristics of the communication lines can be utilized to further improve communication efficiency, improve throughput, and stabilize system operation.

In the sixth embodiment of the invention scanned image data may be sent over the data channel 35. Reading by the scanner 57 occurs in conjunction with the recording medium being conveyed from the start of printing to the end of printing. As a result, the scanned image data is sent from the printer 122 to the host computer 121 about the time the recording medium is discharged from the printer 122. More specifically, the print data and the scanned image data are unlikely to be transmitted at the same time. If the data channel 35 is a half-duplex communication circuit, the bit rate per side drops during two-way communication, but by offsetting the transmission timing when transmitting both print data and scanned image data, a drop in the bit rate can be avoided. Therefore, if the scanned image data and the print data are transmitted using the data channel 35 when both the data channel 35 and auxiliary data channel 36 are half-duplex communication channels, faster transmission is possible than when the scanned image data and the read magnetic stripe data are transmitted on the auxiliary data channel 36.

It will be obvious to one with ordinary skill in the related art that that the foregoing embodiments are simply examples of the invention, and can be modified and adapted in many ways without departing from the scope of the accompanying claims.

For example, the recording systems described in the foregoing embodiments may have hardware corresponding to the function blocks in the different function block diagrams, but configurations that render the functions of the plural function blocks by the cooperation of software and hardware components executing a specific program by means of one or a few hardware components are also conceivable.

The channel assignment process shown in FIG. 10 is also executed by the CPU of the host computer in the foregoing embodiments, but a configuration in which the control unit of the printer executes the channel assignment process, and the control unit generates and sends control information describing the channel assignments to the host computer, is also conceivable.

In the foregoing embodiments the host computer and printer each have a plurality of communication interfaces, and each of these plural communication interfaces renders one communication line, but the actual configuration of the interface circuits is not limited to the number of communication lines. More specifically, the communication paths of the invention are each simply physical communication paths and the individual communication paths can be physically differentiated, and include both wired communication paths that use a wired communication cable as the communication medium and wireless communication paths that use electromagnetic waves as the communication medium.

A configuration in which a wired communication interface circuit rendered by a single semiconductor device is connected to a plurality of connectors, a communication cable is connected to each of these plural connectors, and each communication cable renders a communication circuit (communication path) is also conceivable.

Likewise, a configuration in which a wireless communication interface circuit rendered by a single semiconductor device is connected to a plurality of antennae, and each of these plural antennae renders a communication line, is also conceivable.

Yet further, a configuration in which a plurality of wireless communication lines are rendered by a single semiconductor device rendering a wireless communication interface circuit that sends and receives wireless signals on plural frequency bands (channels) from a single antenna is also conceivable. In this configuration each of the channels of a different frequency band corresponds to a single communication path.

Yet further, infrared communication can be used as a wireless communication path, and optical fiber cables can be used as wired communication lines.

It will also be obvious to one with ordinary skill in the related art that the number of communication lines, the types of communication lines, and the method of assigning communication channels described in the foregoing embodiments are examples only, and the invention is not limited thereto. For example, four or more communication lines may be formed between the host computer and printer, even more virtual communication channels can be provided, and the specific embodiments can be varied in many ways.

Yet further, the foregoing embodiments are described using a passbook with a magnetic stripe as an example of the recording medium, but this is obviously merely an example, any desirable type of recording medium can be used, and other aspects of the detailed configuration can be changed as desired.

Yet further, the printer reads the magnetic stripe by means of a magnetic head and sends the read data to the host computer in the embodiments described above, but the invention is not so limited. For example, a recording medium on which magnetic ink characters are printed may be set in the printer, and the printer may execute a magnetic ink character recognition (MICR) process and send the MICR data to the host computer. In this configuration the MICR data is transmitted over data channel 31, 35 or the auxiliary data channel 36 in the same way as the read magnetic stripe data.

Yet further, the printer is not limited to any particular type of printer, and may be a thermal printer, inkjet printer, dot impact printer, or laser printer, for example, may be a printer that is built in to another device or a printer that is connected to a computer disposed in another device, and the application of the invention is not limited.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording system comprising:
a recording device having a plurality of communication interfaces that can communicate independently; and
a host computer having a plurality of communication interfaces that can communicate independently;
wherein the communication interfaces of the recording device and the communication interfaces of the host computer are connected 1:1 rendering communication paths,
a plurality of virtual communication channels including a data communication channel and a control communication channel are assigned to the communication paths,
data is communicated by packet communication through these communication channels, and
when the recording device and host computer are connected through the plural communication paths, only the data communication channel is assigned to at least one of the plural communication paths, wherein:
when the recording device and the host computer are connected by one communication path, a packet containing information identifying the communication channel is generated and transmitted by packet communication through the communication path; and
when the recording device and the host computer are connected by a plurality of communication paths, packets transmitted on the data communication channel are packets not containing information identifying the communication channel.

2. The recording system described in claim 1, wherein:
recording data is transmitted at least from the host computer to the recording device on the data communication channel.

3. The recording system described in claim 1, wherein:
the control communication channel includes at least one of a channel for communicating information related to security, and a channel for communicating information related to a status of the recording device or the host computer.

4. The recording system described in claim 1, wherein:
the recording device and the host computer have a plurality of communication interfaces rendering communication paths of different attributes;
a plurality of communication paths having different attributes are rendered between the recording device and the host computer by these plural communication interfaces; and
the communication channels are assigned based on the attributes of the individual communication paths to the plural communication paths.

5. The recording system described in claim 1, wherein:
the plural communication interfaces of the recording device and the host computer include a wired communication interface rendering a wired communication path and a wireless communication interface rendering a wireless communication path;
a wired communication path and a wireless communication path are rendered between the recording device and the host computer by these plural communication interfaces; and
a plurality of virtual communication channels including a data communication channel and a control communication channel are assigned to the plural communication paths including the wired communication path and the wireless communication path.

6. The recording system described in claim 5, wherein:
a data communication channel is assigned to the wired communication path, and the control communication channel is assigned to the wireless communication path.

7. The recording system described in claim 1, wherein:
the recording device and the host computer each have as the communication interfaces a plurality of wireless communication interfaces rendering wireless communication paths;
a plurality of wireless communication paths are rendered between the recording device and the host computer by these plural communication interfaces; and
a plurality of virtual communication channels including a data communication channel and control communication channel are assigned to each of the communication paths based on the possible communication speeds or an indicator of the robustness of the security of these wireless communication paths.

8. The recording system described in claim 1, wherein:
when data sent and received through the data communication channel can be typed based on an attribute, packets are transmitted by data type through the data communication channel and another communication channel assigned to a communication path other than the data channel.

9. The recording system described in claim 1, wherein:
an auxiliary data communication channel is assigned to a communication path other than the communication path to which the data communication channel is assigned; and when the data transmitted on the data communication channel can be typed based on an attribute, packets are sent and received by switching the data communication channel and auxiliary data communication channel based on data type.

10. The recording system described in claim 9, wherein:
the communication path to which the data communication channel is assigned and the communication path to which the auxiliary data communication channel is assigned have different attributes; and when the data transmitted on the data communication channel can be typed based on an attribute, packets are transmitted by switching the data communication channel and auxiliary data communication channel based on data type and communication path attributes.

11. The recording system described in claim 1, wherein:
the communication interface is a serial interface.

12. A communication control method for a recording system, wherein the recording system has a recording device having a plurality of communication interfaces that can communicate independently, and a host computer having a plurality of communication interfaces that can communicate independently, and the communication interfaces of the recording device and the communication interfaces of the host computer are connected 1:1 rendering communication paths, the communication control method comprises steps of:

assigning a plurality of virtual communication channels including a data communication channel and a control communication channel to the communication paths and sending and receiving data through these communication channels by packet communication; and assigning only the data communication channel to at least one of the plural communication paths for communication when the recording device and host computer are connected by the plural communication paths, wherein:

when the recording device and the host computer are connected by one communication path, a packet containing information identifying the communication channel is generated and transmitted by packet communication through the communication path; and when the recording device and the host computer are connected by a plurality of communication paths, packets transmitted on the data communication channel are packets not containing information identifying the communication channel.

13. The communication control method for a recording system described in claim 12, wherein:
data is transmitted from the host computer to the recording device on the data communication channel; and at least information related to security or information related to a status of the recording device or the host computer is communicated through the control communication channel.

* * * * *